(12) United States Patent
Tanigawa

(10) Patent No.: US 7,680,975 B2
(45) Date of Patent: Mar. 16, 2010

(54) SEMICONDUCTOR MEMORY CARD ENABLING CONTINUATION OF PROCESSING WHEN PROCESSING EXECUTION IS INTERRUPTED DUE TO INTERRUPTION OF VOLTAGE SUPPLY

(75) Inventor: Satoshi Tanigawa, Hiroshima (JP)

(73) Assignee: Panasonic Corporation, Osaka (JP)

( * ) Notice: Subject to any disclaimer, the term of this patent is extended or adjusted under 35 U.S.C. 154(b) by 395 days.

(21) Appl. No.: 11/662,184

(22) PCT Filed: Sep. 13, 2005

(86) PCT No.: PCT/JP2005/016849

§ 371 (c)(1),
(2), (4) Date: Mar. 8, 2007

(87) PCT Pub. No.: WO2006/033266

PCT Pub. Date: Mar. 30, 2006

(65) Prior Publication Data

US 2008/0005451 A1    Jan. 3, 2008

(30) Foreign Application Priority Data

Sep. 21, 2004    (JP)    ............... 2004-273023

(51) Int. Cl.
*G06F 1/30* (2006.01)
*G06F 12/16* (2006.01)
*G11C 11/22* (2006.01)

(52) U.S. Cl. ...................... 711/103; 711/115
(58) Field of Classification Search ............... None
See application file for complete search history.

(56) References Cited

U.S. PATENT DOCUMENTS 6,564,286 B2    5/2003    DaCosta
2003/0095463 A1    5/2003    Shimada et al.

FOREIGN PATENT DOCUMENTS

| JP | 2-234260 | 9/1990 |
| JP | 3-111954 | 5/1991 |
| JP | 2003-122648 | 4/2003 |
| JP | 2004-164185 | 6/2004 |

*Primary Examiner*—Kevin Verbrugge
(74) *Attorney, Agent, or Firm*—Wenderoth, Lind & Ponack, L.L.P.

(57) ABSTRACT

The present invention is to provide a semiconductor memory card which enables continuation of processing, even when processing execution is interrupted due to interruption of voltage supply. The semiconductor memory card according to the present invention is a semiconductor memory card which can execute a program, which includes: an FeRAM which stores information; a register which stores information regarding the program being executed; a voltage detection unit which detects change in supply voltage to the semiconductor memory card; a save unit which associates register information stored in the register with additional information for specifying the program, and saves the register information and the additional information to the FeRAM in the case where the detection unit detects a predetermined status of voltage decrease; and a return unit which returns the register information to the register in the case where the detection unit detects a predetermined status of voltage increase and when the additional information stored in the FeRAM satisfies a predetermined condition.

11 Claims, 19 Drawing Sheets

| Transport Type | | |
|---|---|---|
| Items | Value | Description |
| Type_A | 0x0010 | TypeA |
| Type_B | 0x0020 | TypeB |
| Type_C | 0x0030 | TypeC |
| Reserved future use | 0x0040-0x00FF | Reserved |
| Reserved | 0x0100-0xFFFF | Reserved |

FIG. 13

Examples of additional information

| Item | Size (byte) | Type | Description |
|---|---|---|---|
| Resume Version | 4 | DWORD | Resume Version |
| Application ID | 4 | DWORD | Application identifier |
| Application Type | 2 | WORD | Application type (RESUME, CA_RESUME, etc...) |
| Transport Type | 2 | WORD | Communication protocol (TYPE_B, TYPE_C, etc...) |
| Transport info length | 4 | DWORD | Length of communication protocol |
| Transport Information | Transport info length | Tsinfo | Communication protocol information |

FIG. 15

| CA information | | | |
|---|---|---|---|
| Item | Size (byte) | Type | Description |
| CA Type | 2 | WORD | CA type |
| CA Key length | 4 | DWORD | Key length |
| CA Key | CA Key length | CAKey | Key information |

FIG. 16

| CA Type | | |
|---|---|---|
| Item | Value | Description |
| NO_USE | 0x0000 | No encryption |
| M_CA_DES | 0xF001 | Single DES |
| M_CA_3DES | 0xF003 | 3 DES |
| M_CA_RSA | 0xF010 | RSA |
| Reserved | | Reserved |

FIG. 18

| Address | Region |
|---|---|
| Highest-order bit 0<br>0x0000~0x7FFF | Destructive readout |
| Highest-order bit 1<br>0x8000~0xFFFF | Non-destructive readout |

SEMICONDUCTOR MEMORY CARD ENABLING CONTINUATION OF PROCESSING WHEN PROCESSING EXECUTION IS INTERRUPTED DUE TO INTERRUPTION OF VOLTAGE SUPPLY

TECHNICAL FIELD

The present invention relates to a semiconductor memory card with a function for executing a program.

BACKGROUND ART

In recent years, magnetic cards such as credit cards have been shifted to semiconductor memory cards. The reason is semiconductor memory cards have not only a larger memory capacity than magnetic cards, but also have enhanced security functions in order to prevent leakage of stored information, such as personal information. An IC card is an example of a semiconductor memory card with a function to protect the stored data.

IC cards can be classified into a contact type and a contactless type depending on communication configuration between the IC card and the reader/writer. A contactless IC card is an IC card which sends and receives data using low-intensity radio waves transmitted from the reader/writer. The contactless IC card is hereinafter simply referred to as "IC card".

FIG. 1 is a diagram showing an example of hardware configuration of a typical IC card. The IC card shown in FIG. 1 includes a ROM 201 which stores a program, a Ferroelectric Random Access Memory (FeRAM) 202 which is a non-volatile memory for storing temporary data which are used when executing a program, and data written from outside, an antenna 203 which is an interface (I/F) for external communications, and a CPU 200 for controlling various command processing and the like based on the program stored in the ROM 201.

The CPU 200 further includes an Arithmetic and Logic Unit (ALU) 204 which is a circuit for arithmetic processing, and a register 205 which is a memory element that holds calculated values and execution statuses.

Conventionally, an IC card has only been required to perform a single simple service processing, such as electronic money and the like. However, with the recent introduction of advanced authentication technologies, such as biometric authentication, more complex processing needs to be performed. In the case where a complex processing is performed, more time is necessary to continue communication with a reader/writer than the case where simple processing is performed.

It is also noted that recent IC cards can execute plural application programs (hereinafter simply referred to as "programs") each corresponding to plural services, because processing of plural services is required. IC cards can use services provided by a server through communication with a reader/writer connected to the server which is a host computer that provides the services.

Here, it is a characteristic of a contactless IC card that the electric voltage is provided from electric waves transmitted from the reader/writer. This causes voltage supply interruption, and the processing is reset when the IC card moves away from the reader/writer.

Thus, in order to continue processing in an environment where the voltage supply is unstable, a method to resume processing after voltage supply resumes by configuring all registers and RAMs with non-volatile memory FeRAM has been introduced.

DISCLOSURE OF INVENTION

Problems that Invention is to Solve

However, it is not practical to commercialize an IC card using a non-volatile memory FeRAM for a register or a RAM, especially for a part such as a register in which access frequency is high, because the characteristic of FeRAM makes the product life-span extremely short.

In addition, as described above, the IC card can perform processing corresponding to each of the services, and the IC card may perform different processing before the voltage supply cutoff and after the voltage supply resumes. Thus, there are cases where processing cannot be performed using calculated values and the like held in the FeRAM which is a register.

The present invention has been conceived in order to solve the abovementioned problem, and has an object to provide a semiconductor memory card which enables continuation of processing, even when processing execution is interrupted due to interruption of voltage supply.

Means to Solve the Problems

In order to solve the abovementioned problem, a semiconductor memory card according to the present invention is a semiconductor memory card which can execute a program, the memory card including: a non-volatile memory which stores information; a register which stores information regarding the program being executed; a detection unit which detects change in supply voltage to the semiconductor memory card; a save unit which, in the case where the detection unit detects a predetermined status of voltage decrease, associates register information stored in the register with additional information for specifying the program, and saves the register information and the additional information to the non-volatile memory; and a return unit which returns the register information to the register in the case where the detection unit detects a predetermined status of voltage increase and when the additional information stored in the non-volatile memory satisfies a predetermined condition.

In addition, the semiconductor memory card according to the present invention may further include a communication unit which communicates with an other device, in which the return unit may return the register information to the register in the case where the detection unit detects the predetermined status of voltage increase, and when the additional information includes information obtained through communication between the communication unit and the other device.

In addition, the semiconductor memory card according to the present invention may further include a communication type obtainment unit which obtains information indicating a communication type used for communication between the communication unit and the other device, in which the return unit may return the register information to the register in the case where the detection unit detects the predetermined status of voltage increase and when the additional information includes information indicating the communication type obtained by the communication type obtainment unit.

In addition, in the semiconductor memory card according to the present invention, the non-volatile memory may store plural pieces of register information which differ from one another, and the return unit may return the register information associated with the additional information including information indicating the communication type obtained by the communication type obtainment unit in the case where the detection unit detects the predetermined status of voltage increase.

In addition, in the semiconductor memory card according to the present invention, the save unit may further associate encryption information, which indicates the strength of encryption used by the program, with the register information, and save the encryption information and the register information to the non-volatile memory, the semiconductor memory card may further include: a communication unit which communicates with the other device; a return judgment unit which judges, before the return unit returns the register information to the register, whether or not the encryption strength is equal to or higher than a predetermined strength; an authentication unit which authenticates the other device in the case where the return judgment unit judges that the encryption strength indicated by the encryption information is equal to or higher than the predetermined strength; in which the return unit returns the register information to the register in the case where the detection unit detects the predetermined status of voltage increase, and when the additional information stored in the non-volatile memory satisfies a predetermined condition and authentication of another device by the authentication unit is successful.

In addition, in the semiconductor memory card according to the present invention, the non-volatile memory may include a destructive readout region, and the semiconductor memory card may further include a save judgment unit which judges, before the save unit saves the register information to the register, whether or not the encryption strength used by the program which is being executed is equal to or higher than the predetermined strength, in which the save unit associates the register information with the additional information and save the register information and the additional information to the destructive readout region of the non-volatile memory in the case where the detection unit detects the predetermined voltage decrease, and when the save judgment unit judges that the encryption strength indicated by the encryption information is equal to or higher than the predetermined strength.

In addition, in the semiconductor memory card according to the present invention, the non-volatile memory may be Ferroelectric Random Access Memory (FeRAM).

In addition, a program execution method according to the present invention is a method for intermittently executing a program in a semiconductor memory card which can execute a program, in which the semiconductor memory card includes a non-volatile memory which stores information and a register which stores information regarding the program being executed, and the program execution method includes: a detection step of detecting a change in supply voltage for the semiconductor memory card; a save step of, in the case where the predetermined status of voltage decrease is detected, associating the register information stored in the register with additional information for specifying the program and saving the register information and the additional information to the non-volatile memory; and a return step of returning the register information to the register in the case where the predetermined status of voltage increase is detected in the detection step, and when the additional information stored in the non-volatile memory satisfies a predetermined condition.

In addition, an execution program according to the present invention is an execution program for intermittently causing a semiconductor memory card to execute the application program stored in a semiconductor memory card which can execute the application program, in which the semiconductor memory card includes a non-volatile memory which stores information and a register which stores information regarding an application program being executed, the execution program is a program causing a computer to execute the following steps: a detection step of detecting a change in supply voltage to the semiconductor memory card; a save step of, in the case where the predetermined status of voltage decrease is detected, associating the register information stored in the register with additional information for specifying the program, and saving the register information and the additional information to the non-volatile memory; and a return step of returning the register information to the register in the case where the predetermined status of voltage increase is detected in the detection step, and when the additional information stored in the non-volatile memory satisfies a predetermined condition.

In addition, a storage medium according to the present invention is a computer-readable storage medium, in which an execution program for intermittently executing an application program in a semiconductor memory card which can execute the application program, in which the semiconductor memory card includes a non-volatile memory which stores information and a register which stores information regarding application program being executed, the storage medium stores an execution program causing the memory card to execute the following steps: a detection step of detecting a change in supply voltage for the semiconductor memory card; a save step of, in the case where the predetermined status of voltage decrease is detected, associating the register information stored in the register with additional information for specifying the program, and saving the register information and the additional information to the non-volatile memory; and a return step of returning the register information to the register in the case where the predetermined status of voltage increase is detected in the detection step, and when the additional information stored in the non-volatile memory satisfies a predetermined condition.

An integrated circuit according to the present invention is an integrated circuit for intermittently executing a program in a semiconductor memory card which can execute a program, in which a non-volatile memory which stores information is set in the semiconductor memory card, and the integrated circuit includes: a register which stores information regarding the program being executed; a detection unit which detects change in supply voltage to the semiconductor memory card; a save unit which, in the case where the detection unit detects a predetermined status of voltage decrease, associate register information stored in the register with additional information for specifying the program, and to save the register information and the additional information to the non-volatile memory; and a return unit returns the register information to the register in the case where the detection unit detects a predetermined status of voltage increase and when the additional information stored in the non-volatile memory satisfies a predetermined condition.

Furthermore, the present invention can be realized as a method including the characteristic components of the semiconductor memory card according to the present invention as steps, or as a program including the steps, or a storage medium such as CD-ROM and the like in which the program is stored, or an integrated circuit. The program can also be distributed via a transmitting medium such as communication network and the like.

EFFECTS OF THE INVENTION

The present invention can provide a semiconductor memory card which enables continuation of processing after voltage supply resumes, even when a voltage supply is terminated and processing is interrupted.

According to the present invention, the semiconductor memory card enables continuation of interrupted processing when a voltage supply necessary for the processing resumes after the supply of voltage resumes. To put it differently, processing can be intermittently performed.

In addition, two or more independent processing can be intermittently performed for each processing.

In addition, security when performing intermittent processing can be improved. Namely, it is possible to perform intermittent and safe processing while handling highly confidential information.

BRIEF DESCRIPTION OF DRAWINGS

FIG. 13 is a diagram showing an available information type for identifying register information to return.

FIG. 15 is a diagram showing three types of information regarding encryption.

FIG. 16 is a diagram showing kinds of CA Type.

FIG. 18 is a diagram showing an address of a destructive readout region and non-destructive readout region of a FeRAM according to the third embodiment.

NUMERICAL REFERENCES

Figure 1:
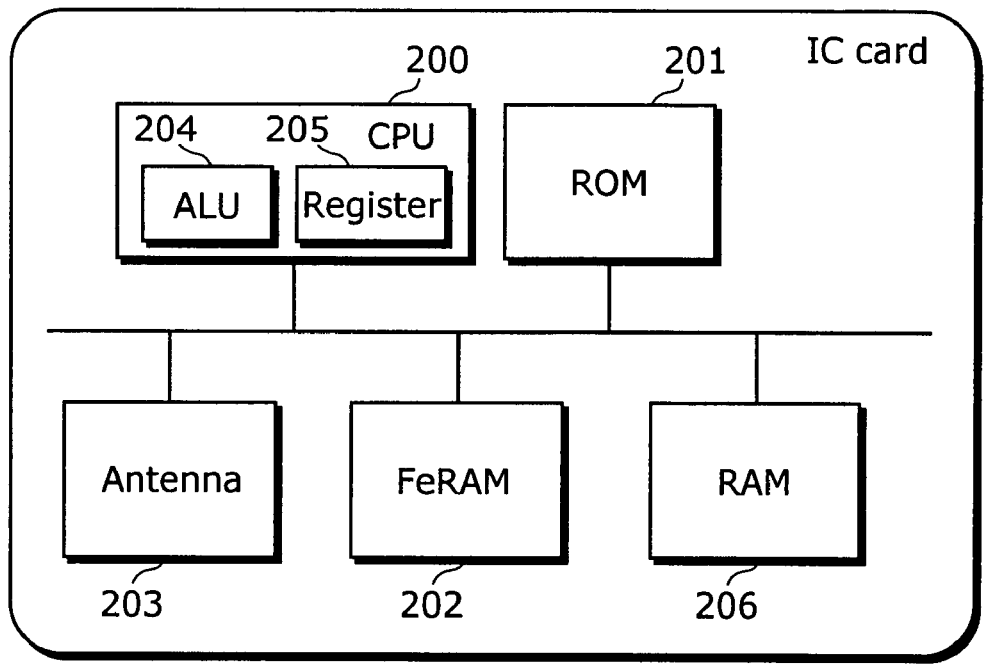
FIG. 1 is a block diagram showing a hardware configuration of an IC card in general.

100 IC card
202 FeRAM
203 Antenna
300 Voltage detection unit
301 I/F unit
302 Save unit
303 Return unit
304 Save judgment unit
305 Authentication unit
306 Return judgment unit
800 Communication type obtainment unit

BEST MODE FOR CARRYING OUT THE INVENTION

The embodiments of the present invention will be described hereafter with reference to the drawings.

First Embodiment

First of all, a configuration of an IC card according to the first embodiment is described with reference to FIG. 2.

Figure 2:
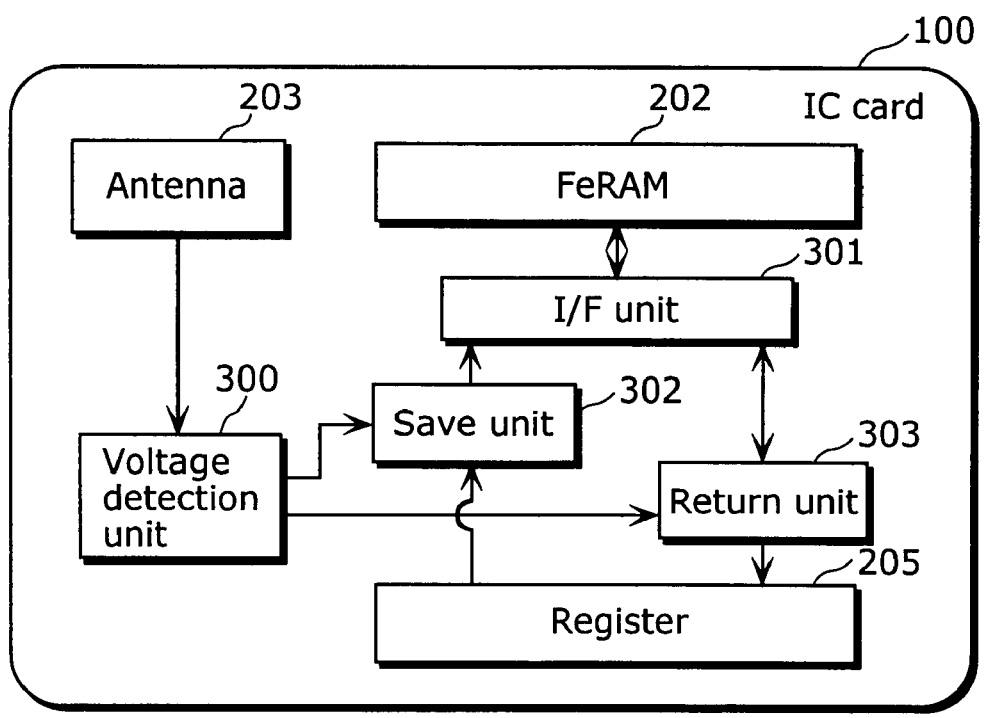
FIG. 2 is a functional block diagram showing a functional configuration of an IC card according to the first embodiment.

FIG. 2 is a functional block diagram showing a functional configuration of an IC card 100 according to the first embodiment. The IC card 100 is an example of the semiconductor memory card according to the present invention, and is a contactless IC card which can execute application programs.

As shown in FIG. 2, the IC card 100 includes an FeRAM 202, an I/F unit 301, an antenna 203, a voltage detection unit 300, a register 205, a save unit 302, and a return unit 303.

Note that the hardware configuration of the IC card 100 is identical to the conventional IC card shown in FIG. 1. It is also noted that illustration and description regarding the components which the IC card 100 basically includes such as the component for performing processing based on information stored in the register 205 are omitted, and only characteristic components of the IC card 100 shall be illustrated and described.

The FeRAM 202 is a non-volatile memory which stores data and the like used for the processing performed in the IC card 100. The antenna 203 is an example of a communication unit in the semiconductor memory card according to the present invention, and is a communication I/F for external communication. The IC card 100 receives voltage supply by receiving electric wave on the antenna 203.

The voltage detection unit 300 is a processing unit for detecting change in supply voltage. The register 205 is a memory element which holds calculated value and execution status. The save unit 302 is a processing unit which saves information regarding calculated value and status of the program being executed, stored in the register 205 (hereinafter referred to as "register information"), when the voltage detection unit 300 detects a predetermined status of voltage decrease.

The return unit 303 is a processing unit which returns register information to the register 205 in the case where there is register information stored in the FeRAM 202 and when the voltage detection unit 300 detects a predetermined status of voltage increase.

The I/F unit 301 is an I/F which intermediates information exchange between the save unit 302, the return unit 303 and the FeRAM 202.

With the configuration above, the IC card 100 according to the first embodiment can continue interrupted processing which was terminated due to lack of necessary voltage supply, after the voltage supply resumes. Operations of the IC card 100 when continuing processing which is once interrupted are described hereafter.

Figure 3:
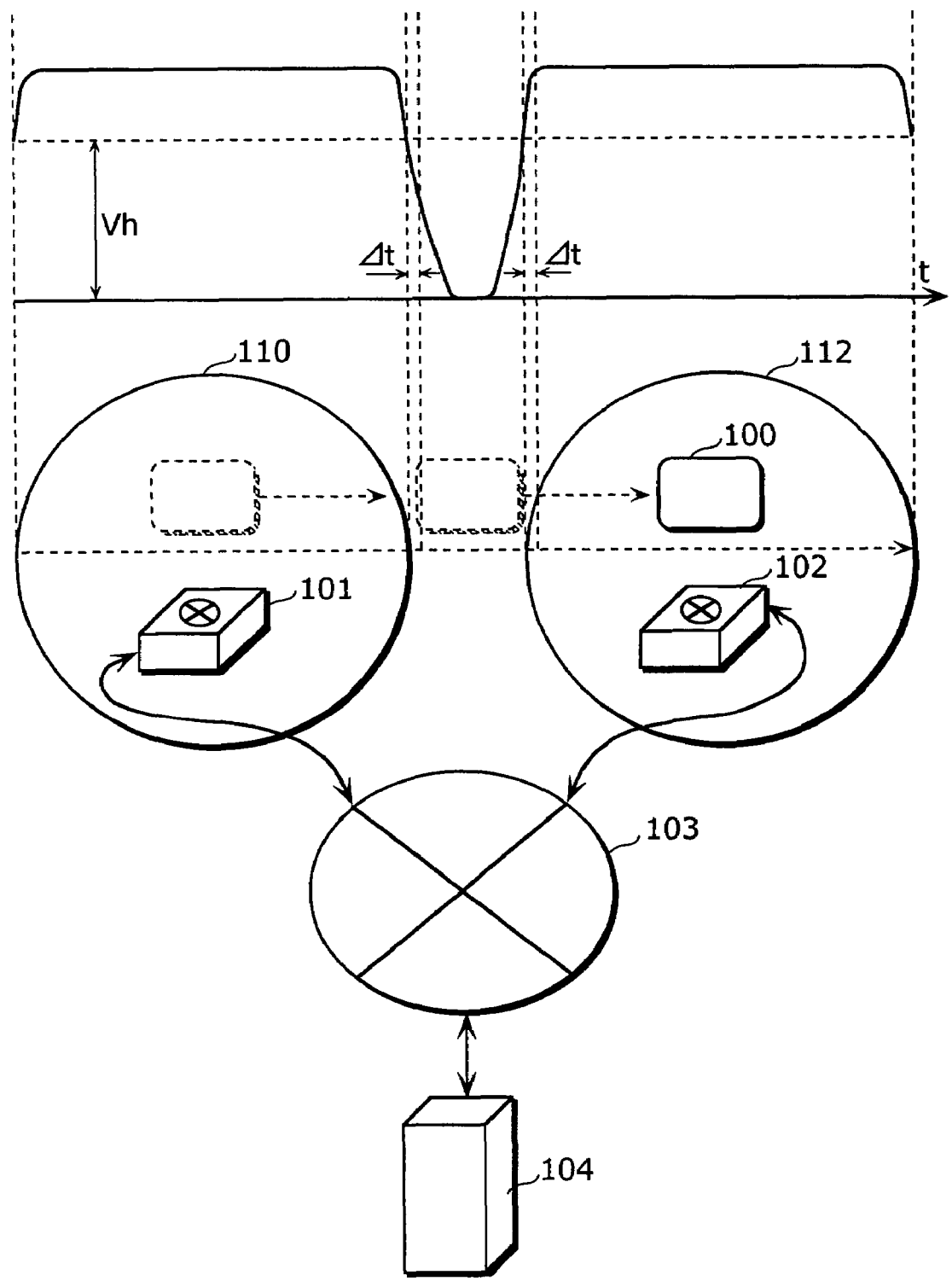
FIG. 3 is a schematic diagram showing a use environment and a change in supply voltage of the IC card according to the first embodiment.

FIG. 3 is a schematic diagram showing a use environment and change in supply voltage for the IC card 100 according to the first embodiment.

The use environment shown in FIG. 3 includes: a server 104 which provides, manages, and holds various services; a reader/writer 101 and a reader/writer 102 which are terminals for performing communication with the IC card 100; and a network 103 mutually connecting the server 104 and the reader/writer 101, the reader/writer 102.

In addition, an area where the IC card 100 can communicate with the reader/writer 101 is an area 110, and an area where the IC card 100 can communicate with the reader/writer 102 is an area 112. An area outside the area 110 and the area 112 is referred to as non-communication area.

The server 104 includes at least one application program for providing service to the IC card 100 and a function for executing the application program. In addition, the server 104 provides the service to the IC card 100 by communicating with the IC card 100 via the reader/writer 101 and the reader/writer 102.

Each of the reader/writer 101 and the reader/writer 102 includes, at least a function for sending information sent from the server 104 to the IC card 100, and a function for receiving a response or request for the server 104 from the IC card 100, and send the response or the request to the server 104.

Note that the user who holds the IC card 100 moves at a constant speed in the use environment in FIG. 1, and it is assumed that the user sequentially passes the area 110, the non-communication area, and the area 112. It is assumed that a case where the IC card 100 continue processing for the same service in the area 110 and the area 112 during the movement. In the movement above, voltage supply to the IC card 100 is terminated when entering the non-communication area, and the information stored in the register 205 disappears. Thus, in the IC card 100, prior to the completion of termination of the voltage supply, the save unit 302 saves the register information to the FeRAM 202 which is a non-volatile memory. Thus, the IC card 100 can be prepared for the interruption and resume of the processing.

Figure 4:
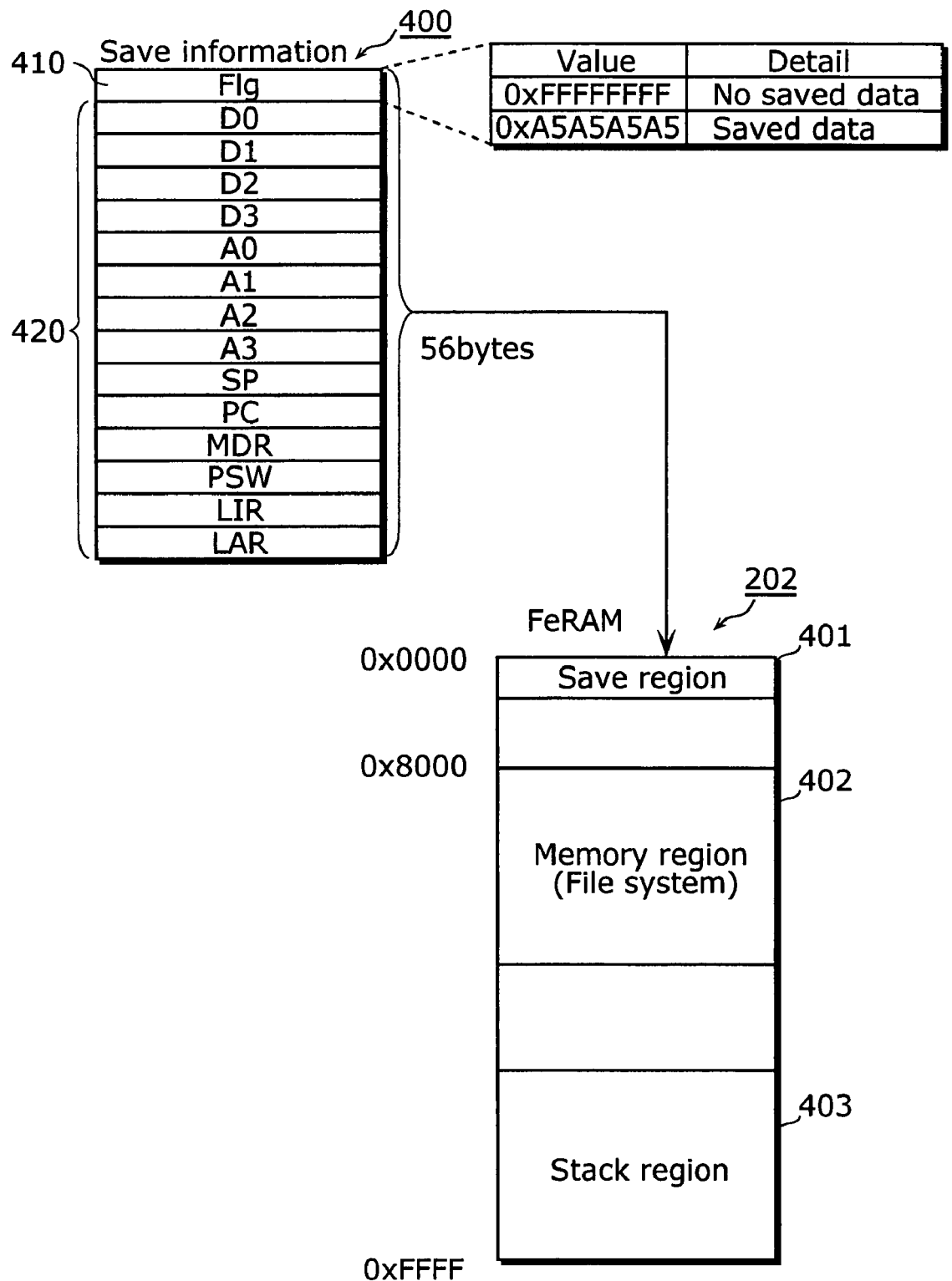
FIG. 4 is a diagram showing an example of data configuration of save information and an example of a memory map of a FeRAM according to the first embodiment.

FIG. 4 is a diagram showing an example of data configuration of save information and an example of a FeRAM memory map according to the first embodiment.

The save information 400 is information saved to the FeRAM 202 by the save unit 302, and as shown in FIG. 4, is information associated with flag information 410 indicating a flag value and register information 420 which is a group of data collected from the register 205.

The flag value is a value indicating "saved data" or "no saved data", and is set by the save unit 302. When the register information 420 is stored in the FeRAM 202, "0xA5A5A5A5" showing "saved data" is set.

As shown in FIG. 4, the FeRAM 202 includes a save region 401, a memory region 402, and a stack region 403. The save region 401 where the save information 400 is stored is a predetermined region having the address 0x0000 of the FeRAM 202 as a starting address.

Figure 5:
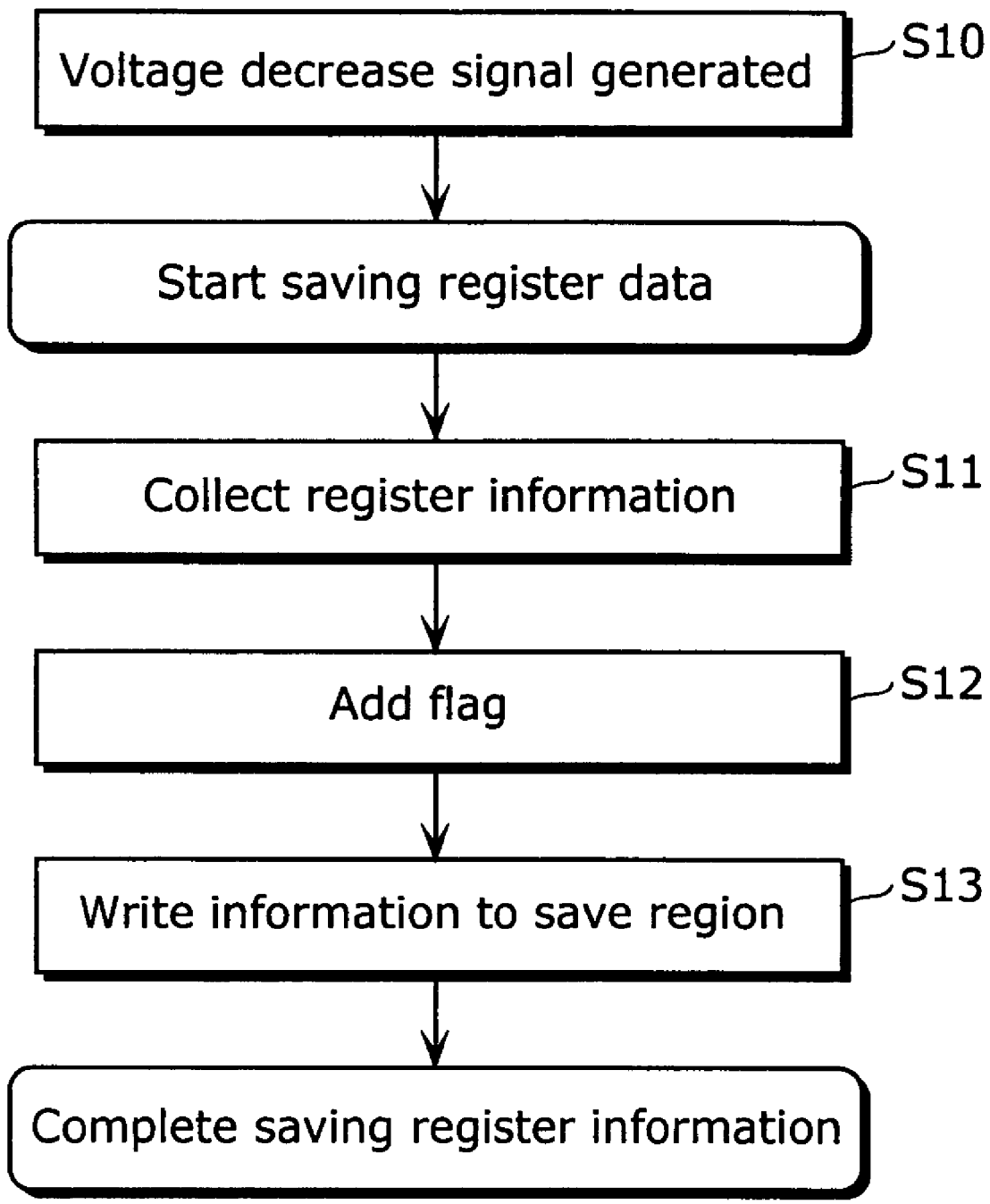
FIG. 5 is a flowchart showing a procedure for saving the register information in an IC card according to the first embodiment.

FIG. 5 is a flowchart showing a procedure for terminating processing in progress in order to save the resister information 420 when the voltage detection unit 300 detects a predetermined status of voltage decrease.

With reference to FIG. 5, operations when the IC card 100 of the first embodiment saves the register information 420 is described.

First of all, in the case where the IC card 100 exists in the area 110 where the IC card 100 can communicate with the reader/writer 101, the IC card 100 receives services by communicating with the server 104 via the reader/writer 101. The IC card 100 starts processing corresponding to the service, when the communication starts.

When the IC card 100 enters the non-communication area prior to the completion of the processing, the voltage detection unit 300 in the IC card 100 detects a status in which the supply voltage is lower than the threshold value Vh continues for a time $\Delta t$.

When the voltage decrease described above is detected, the voltage detection unit 300 generates a signal (hereinafter referred to as "voltage decrease signal") for notifying voltage decrease to the save unit 302 (S10).

With the generation of the voltage decrease signal, save of the register information 420 is started. More specifically, the save unit 302 collects the register information 420 from the register 205 (S11). Furthermore, the save unit 302 adds a flag value showing "saved data" is added to the register information 420 (S12). The save unit 302 writes the register information with a flag value to the save region of the FeRAM 202 (S13).

With the series of operations, the register information regarding the program being executed is saved to the non-volatile memory FeRAM 202. Thus, the IC card 100 can be prepared for the interruption of the processing. Subsequently, even when the register information 420 stored in the register 205 disappears due to the voltage supply decrease, processing can be resumed by returning the saved register information 420 to the register 205.

Figure 6:
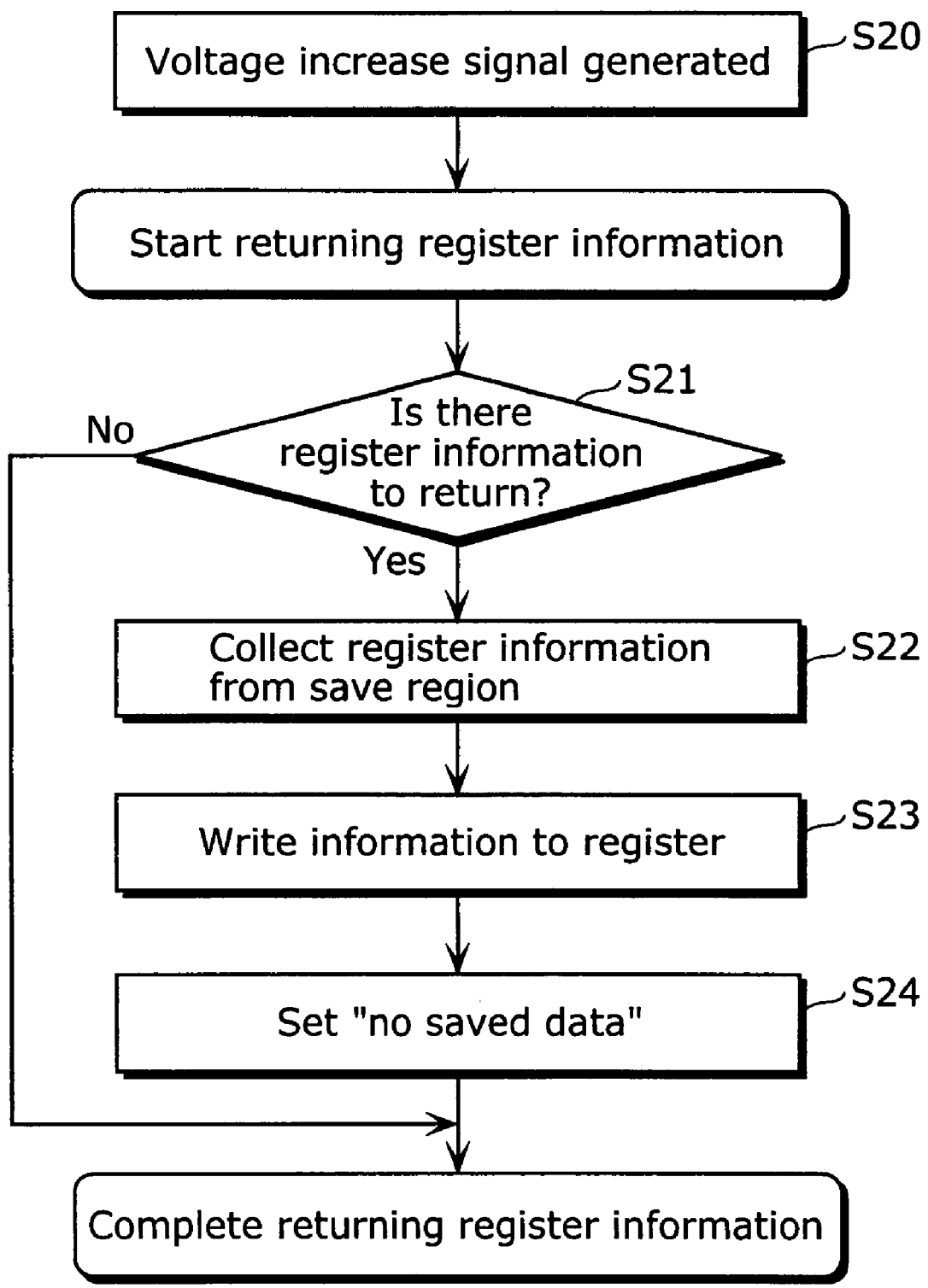
FIG. 6 is a flowchart showing a procedure for resuming the processing in the IC card according to the first embodiment.

FIG. 6 is a flowchart showing a procedure for resuming interrupted processing when the voltage detection unit 300 detects voltage increase.

Operations of the IC card 100 when the saved register information 420 returns to the register 205 are described with reference to FIG. 6.

With the series of operations shown in FIG. 5, after the register information 420 is written on the save region 401, the IC card 100 enters the area 112 where the IC card can communicate with the reader/writer 102. The voltage detection unit 300 of the IC card 100 detects a status that the supply voltage is higher than the threshold value Vh for the time $\Delta t$ when entering the area 112. When the voltage increase is detected, the voltage detection unit 300 sends a signal for notifying increasing voltage (hereinafter referred to as "voltage increase signal") to the save unit 302 (S20).

With the generation of the voltage increase signal, return of the register information 420 is started. More specifically, the return unit 303 first confirms whether or not the register information 420 with the flag value showing "saved data" is stored in the save region 401 of the FeRAM 202.

In the case where the register information 420 with a flag value indicating "saved data" is stored (Yes in S21), the return unit 303 collects the register information 420 from the save region 401 (S22). Furthermore, the collected register information 420 is written to the register 205 (S23). Furthermore, the flag value indicating "saved data" added to the register information 420 in the save region 401 is erased, and set to "no saved data" (S24). In addition, the register information 420 is erased from the save region 401.

With the operations above, the register information 420 saved to the save region 401 prior to the termination of the voltage supply returns to the register 205. After the data returns, the interrupted processing resumes. The IC card 100 completes the series of processing by performing processing such as sending execution results of the program using the returned register information 420 to the server 104 via the reader/writer 102. Note that, in the operations above, in the case where the register information 420 with a flag value indicating "saved data" is not stored in the save region 401 (No in S21), the operation for returning the register information is completed.

As described above, the IC card 100 according to the first embodiment can resume, even in the case where the processing in progress is interrupted due to decrease in supply voltage, the terminated processing can be resumed, in the same status before the termination of the processing, when the voltage supply equal to or more than a predetermined level resumes. In other words, intermittent processing can be performed.

Note that in the first embodiment, a case is assumed that the communication counterpart of the IC card 100 is switched from the reader/writer 101 to the reader/writer 102 before and after the processing interruption.

However, even if the communication counterpart is the same reader/writer before and after the processing interruption, the IC card 100 can save and return register information. In other words, interrupted processing can be resumed.

In addition, although it is noted that after the return of the register information 420 to the register 205, the register information 420 and the flag value added to the register information 420 are erased from the save region 401, the data may not be erased. For example, after the processing using the register information 420 is normally completed, the information may be stored in a region in the FeRAM 202 after setting the flag value as "no saved data". This makes it possible to secure backup of the register information 420 prior to the processing interruption.

In addition, though it is noted that a non-volatile memory included in the IC card 100 is FeRAM, the memory may not be FeRAM. For example, the memory may be EEPROM, as long as the saved information can be held when voltage supply is terminated.

In addition, the voltage detection unit 300 generates the voltage decrease signal in the case where the supply voltage is lower than the threshold value Vh for the time Δt, and generates the voltage increase signal in the case where the supply voltage is higher than the threshold value Vh for the time Δt. However, the time Δt, one of the judgment criteria, may not be the same when the voltage decrease signal is generated and when voltage increase signal is generated.

In addition, the voltage detection unit 300 may generate a voltage decrease signal at a point in time when the supply voltage falls below the threshold value Vh, and for example, generates the voltage decrease signal in the case where a voltage transformation curve approximates a given curve. In the case where the voltage increase signal is generated, other judgment criteria may be used in the same manner. Furthermore, the judgment criteria may be adjusted in accordance with a type of program to be executed or an environment or the like in which the IC card 100 is used.

In addition, it is noted that the voltage detection unit 300 detects the predetermined status of voltage decrease and the predetermined status of voltage increase from the change in supplied voltage. However, the predetermined status may be detected from the change of electric power or electric current. In other words, change in physical amount other than voltage may be used if either termination or resume of stable supply of a voltage or current or both required for normal execution of the program is detected in advance.

Second Embodiment

In the first embodiment, a case where the IC card 100 continues to perform processing for a single service provided by the server 104 is described. In the second embodiment, a case where the IC card 100 intermittently performs plural individual processing, each of the processing corresponds to the respective services is described.

Figures 7, 8:
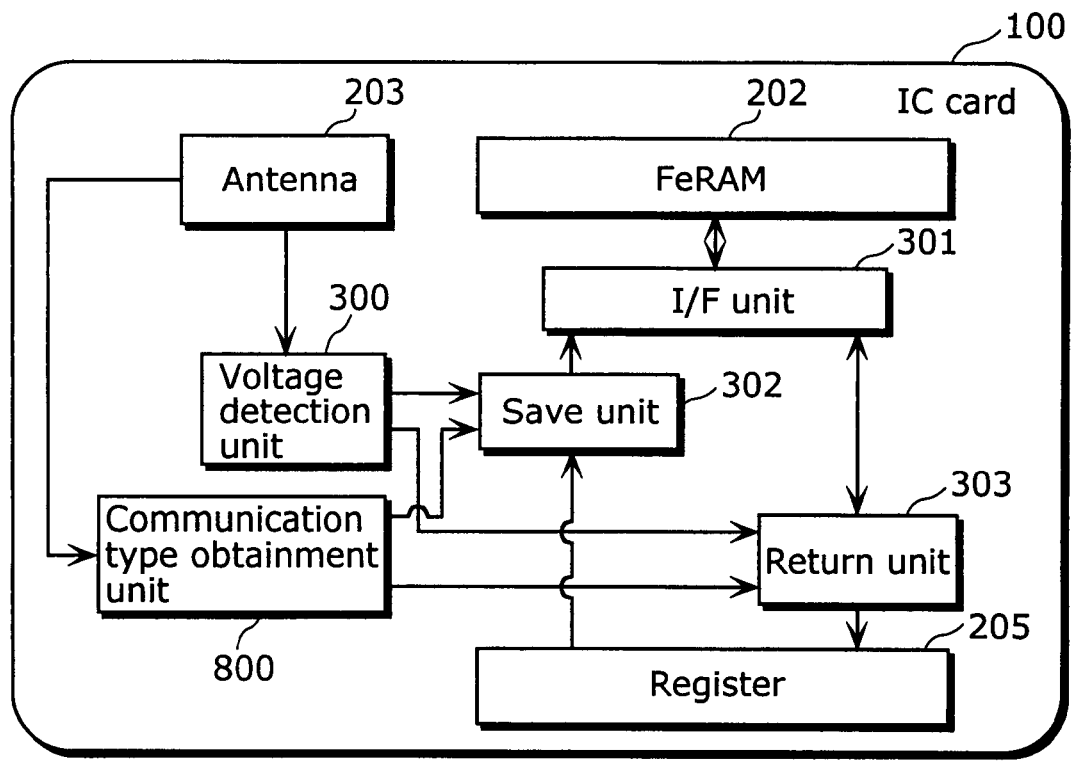
FIG. 7 is a functional block diagram showing a functional configuration of an IC card according to the second embodiment.
FIG. 8 is a diagram showing kinds of Transport Type in a contactless type IC card.

FIG. 7 is a functional block diagram showing a functional configuration of an IC card 100 according to the second embodiment.

As shown in FIG. 7, the IC card 100 according to the second embodiment includes: the antenna 203 which is an I/F for external communication; the voltage detection unit 300 which detects supply voltage change; the save unit 302 which saves register information to an FeRAM 202 based on the voltage decrease signal generated from the voltage detection unit 300; the return unit 303 for returning the saved register information to the register 205; the I/F unit 301 which intermediates information exchange between the save unit 302, the return unit 303 and the FeRAM 202; the FeRAM 202, a non-volatile memory which stores register information; and a communication type obtainment unit 800 which obtains communication type in the communication with the reader/writer.

As described above, the IC card 100 according to the second embodiment includes the communication type obtainment unit 800 in addition to the components equipped in the IC card 100 according to the first embodiment.

The communication type obtainment unit 800, more specifically, obtains Transport Type as a communication type indicating communication protocol for the communication with the reader/writer.

FIG. 8 is a diagram showing kinds of Transport Type for a contactless type IC card.

As shown in FIG. 8, Transport Type for the contactless IC cards mainly includes Type A, Type B, and Type C, each of the types can be distinguished from specification of the physical layers, that is, difference of frequency bands to be used.

In the second embodiment, the communication type obtainment unit 800 notifies the obtained Transport Type to the save unit 302 and the return unit 303, after associating the obtained Transport Type with the type of the program. The save unit 302 saves the notified information to the FeRAM 202 after adding the register information. In addition, the return unit 303, using the notified information, selects and returns the register information satisfying the predetermined condition.

The IC card 100 according to the second embodiment can intermittently perform each of plural different processing with the configuration above.

Operations of the IC card 100 in an environment in which plural services can be provided is described hereafter.

Figure 9:
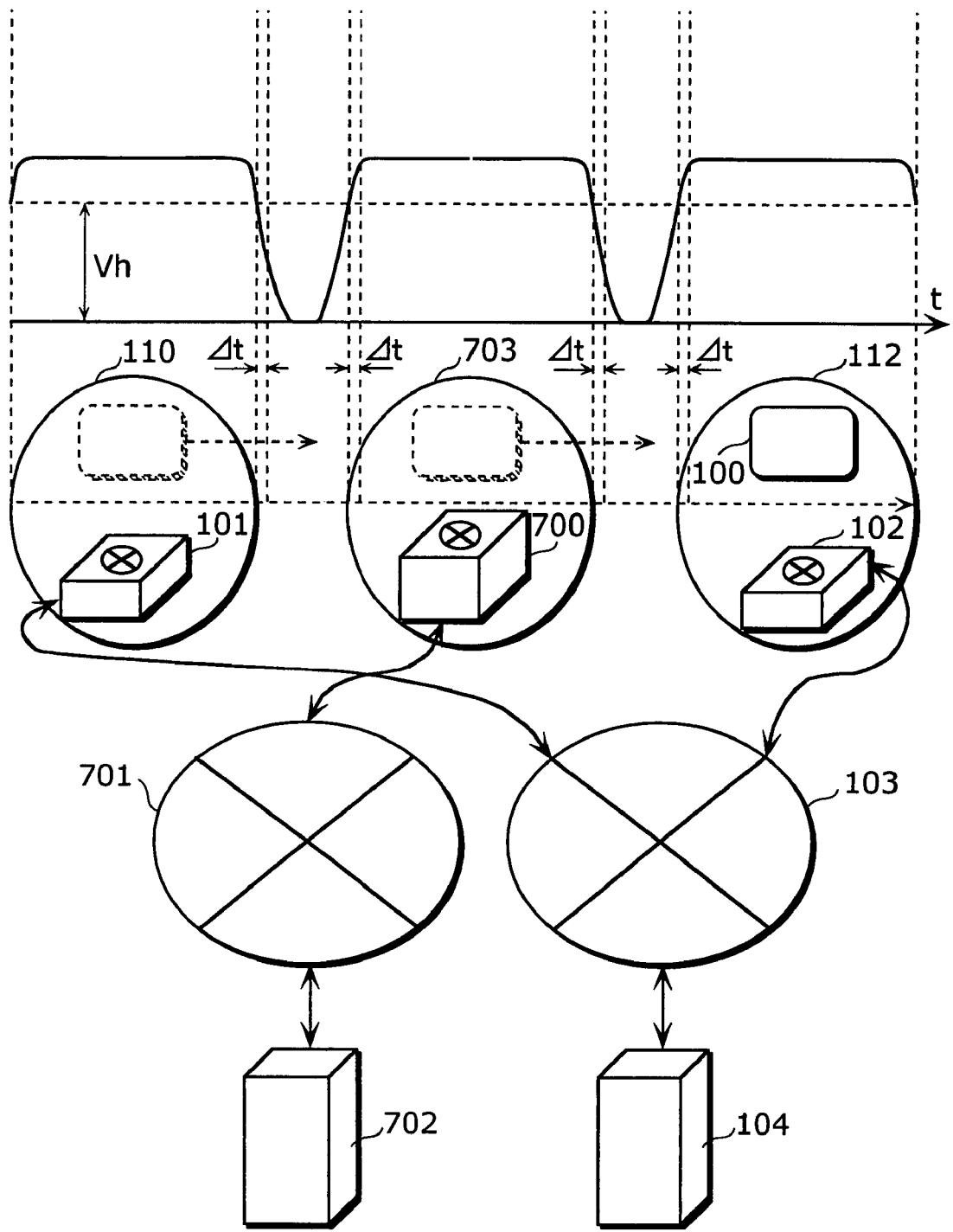
FIG. 9 is a schematic diagram showing a use environment and supply voltage change of an IC card according to the second embodiment.

FIG. 9 is a schematic diagram showing a use environment and supply voltage change for the IC card 100 according to the second embodiment.

The use environment shown in FIG. 9 includes: a server 104 which provides traffic-related service; a reader/writer 101 and a reader/writer 102 which are mutually connected with the server 104 via the network 103; a server 702 which provides public-related service; and a reader/writer 700 connected to a server 702 via a network 701.

In addition, an area where the IC card 100 can communicate with the reader/writer 101 is an area 110, and an area where the IC card 100 can communicate with the reader/writer 102 is an area 112, and an area where the IC card 100 can communicate with the reader/writer 700 is an area 703. The area out of the area 110, the area 112, and the area 703 is referred to as non-communication area.

Each of the server 104 and the server 702 includes at least one or more application program which provides a service for the IC card 100, and includes functions to execute the application program. In addition, the server 104 and the server 702 provide services by communication with the IC card 100, the server 104 communicating with the reader/writer 101 and the reader/writer 102, and the server 702 communicating with the reader/writer 700.

In addition, as described above, a service which the server 104 provides to the IC card 100 is a traffic-related service, and the service which the server 702 provides is a public-related service. Communication type for public-related services and transportation-related services can be judged by communication protocols. In the second embodiment, the communication protocol for the public-related service is Type B, and the communication protocol for the transportation-related service is Type C.

Each of the reader/writer 101 and the reader/writer 102 includes a function for sending information sent from the server 104 to the IC card 100, and for receiving a response or a request for the server 104 from the IC card 100 and sending the response or the request to the server 104.

The reader/writer 700 at least includes a function for sending the information sent from the server 702 to the IC card 100, and a function for receiving a response or a request for the server 702 from the IC card 100, and sending the response or the request to the server 702.

In the use environment of the first embodiment (see FIG. 3), the user who has the IC card 100 may only use the services provided from the server 104, in the use environment of the second embodiment, in addition to the transportation-related services provided from the server 104, public-related services provided from the server 702 via the reader/writer 700.

Note that the user who have the IC card 100 is assumed to be moving at a constant speed in the use environment in FIG. 9, and the user sequentially passes the area 110, non-communication area, the area 703, non-communication area, and the area 112. In addition, a case is assumed that the processing to respond the transportation-related services provided from the server 104 to the IC card 100 is continuously performed during the movement in the area 110 and the area 112.

In the move above, the voltage supply for the IC card 100 is terminated when entering the non-communication area from the area 110, and information stored in the register 205 is disappeared. Thus in the IC card 100, prior to the complete termination of voltage supply, the save unit 302 associates the register information with the information based on communication type, and save the register information and the information based on communication type to the FeRAM 202 which is a non-volatile memory. Thus, it is possible to resume the processing after entering the area 112 where communication with the server 104 can be resumed.

Note that although the IC card 100 passes through the area 703 where the IC card 100 can communicate with the server 702 before reaching the area 112, when entering the area 703, it is judged whether or not program execution corresponding to the communication with the server 702 is interrupted. This judgment is made based on communication type. In the second embodiment, only register information related to the communication with the server 104 is saved, and the register information does not return. Furthermore, a program corresponding to the public-related service provided by the server 702 is activated and processing performed by the program starts.

When the IC card 100 moves to the non-communication area from the area 703 before the completion of the processing, processing is interrupted and the register information is saved to the FeRAM 202 as is the case with the IC card 100 moving to the non-communication area. Here, the register information immediately before the interruption is stored in a region different from the region where the register information is stored when the IC card 100 moves from the area 110 to the non-communication area.

Figure 10:
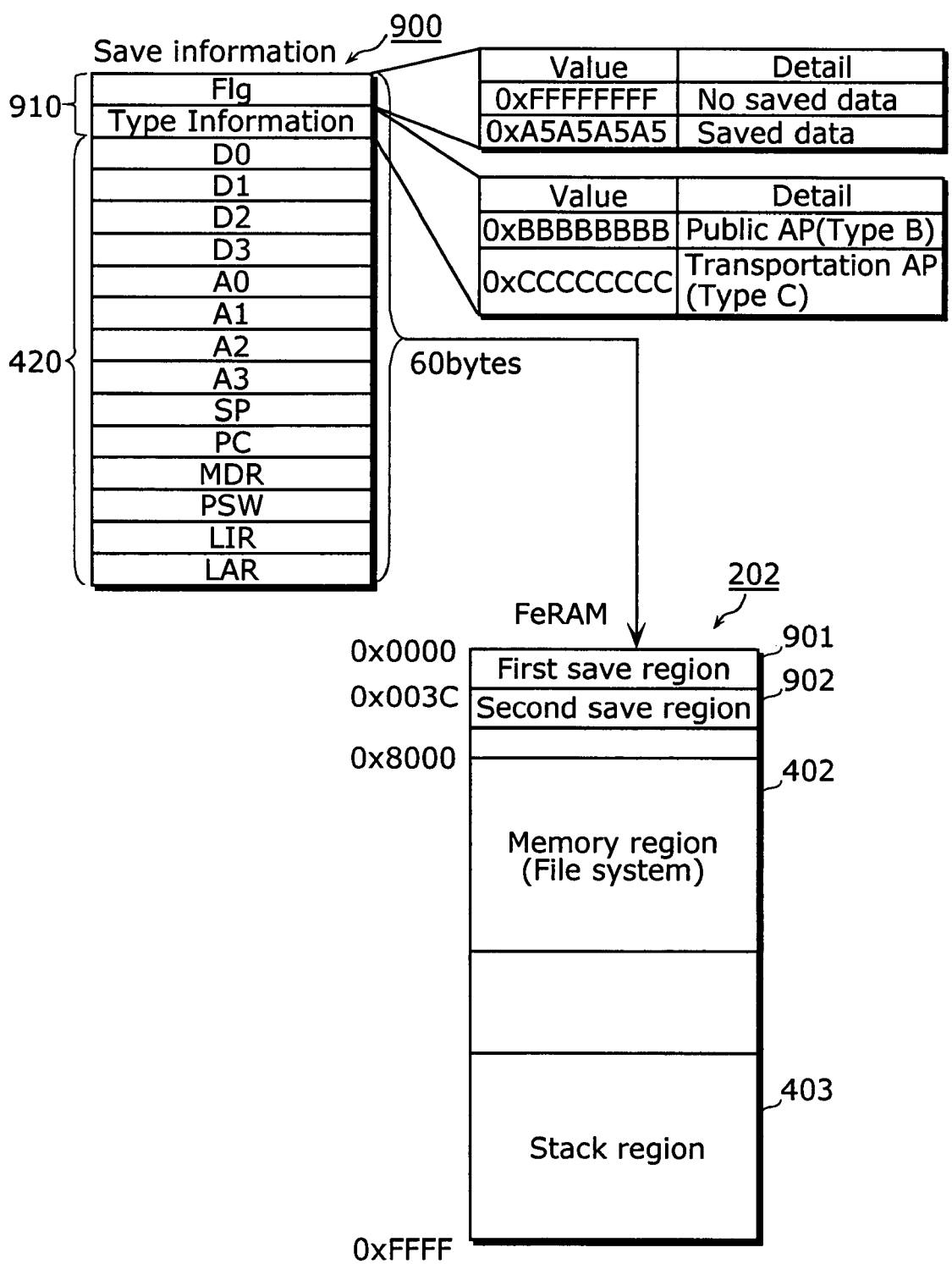
FIG. 10 is a diagram showing an example of data configuration of save information and an example of FeRAM memory map according to the second embodiment.

FIG. 10 is a diagram showing an example of data configuration of save information and an example of a memory map of the FeRAM 202 according to the second embodiment.

The save information 900 is information which is saved to the FeRAM 202 by the save unit 302, and as shown in FIG. 10, is information associated with identification information 910 including a flag value and Type Information, and register information 420, which is a group of data collected from the register 205.

The flag value is a value indicating "saved data" or "no saved data", and is set by the save unit 302. When the register information 420 is stored to the FeRAM 202, "0xA5A5A5A5" indicating "saved data" is set.

Type Information is an example of the additional information in the semiconductor memory card of the present invention, and is information to identify a program which performs processing using the register information 420. In the second embodiment, information based on the communication type is set as Type Information.

More specifically, in the case where the communication type obtainment unit 800 obtains "Type B" from the communication with the reader/writer, a value indicating "Public AP (Type B)" in accordance with the public application program (public AP) is set. In the case where "Type C" is obtained, a value indicating "Transportation A (Type C)" is set.

As shown in FIG. 10, the FeRAM 202 includes a first save region 901, a second save region 902, a memory region 402, and a stack region 403. The first save region 901 is a predetermined region with an address of FeRAM 0x0000 as a starting address, and the second save region 901 is a predetermined region with an address of FeRAM 0x003C as a starting address.

Figure 11:
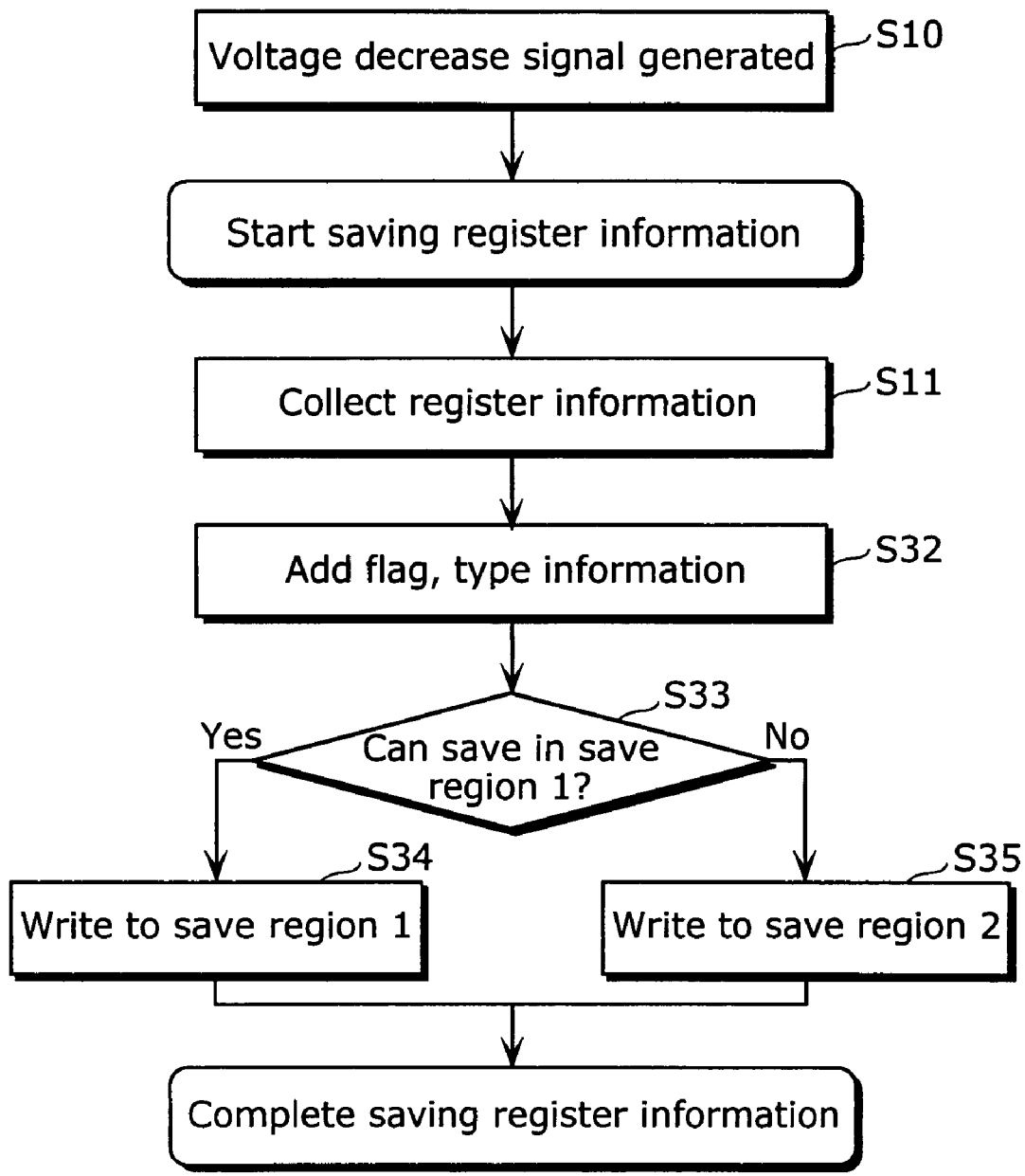
FIG. 11 is a flowchart showing a procedure for saving register information in the IC card according to the second embodiment.

FIG. 11 is a flowchart showing a procedure of saving the resister information 420 so that the processing in progress is interrupted when the voltage detection unit 300 detects a predetermined status of voltage decrease.

With reference to FIG. 11, operations of the IC card 100 according to the second embodiment when saving the register information 420 is described.

First of all, in the case where the IC card 100 exists in the area 110 where the IC card 100 can communicate with the reader/writer 101, the IC card 100 receives transportation-related services by communicating with the server 104 via the reader/writer 101. The IC card 100 starts processing in accordance with the traffic-related service, when the communication starts.

When the IC card 100 enters the non-communication area prior to the completion of the processing, the voltage detection unit 300 in the IC card 100 detects a status in which the supply voltage is lower than the threshold value Vh continues for the time Δt.

When the voltage decrease is detected, the voltage detection unit 300 generates a signal for notifying the voltage decrease to the save unit 302 (S10).

With the generation of the voltage decrease signal, save of the register information 420 is started. More specifically, the save unit 302 first collects the register information 420 from the register 205 (S11).

The save unit 302 further adds a flag value showing "saved data" and information based on a communication type notified from the communication type obtainment unit 800 to the register information 420 (S32). More specifically, the identification information 910 including the flag value indicating "saved data" and "Transportation AP (Type C)" is added to the register information 420.

The save unit 302 checks whether or not the register information 420 with the identification information 910 can be saved to the first save region 901. In the case where the register information 420 can be saved (Yes in S33), the register information 420 with the identification information 910 is saved to the first save region 901. In the case where the register information cannot be saved because of another register information stored in the first save region 901 (No in S33), the register information is saved to the second save region 902.

With the series of operations above, the register information 420 related to the active program in accordance with the traffic-related service is saved to the FeRAM 202, a non-volatile memory along with information for specifying the program.

Subsequently, when the IC card 100 enters the area 703 from the non-communication area, the voltage detection unit 300 detects a predetermined status of voltage increase. Furthermore, in the case where the register information corresponding to the program to be activated, in other words, the register information to return, is stored in the FeRAM 202, the register information is returned to the register 205 by the return unit 303.

Figure 12:
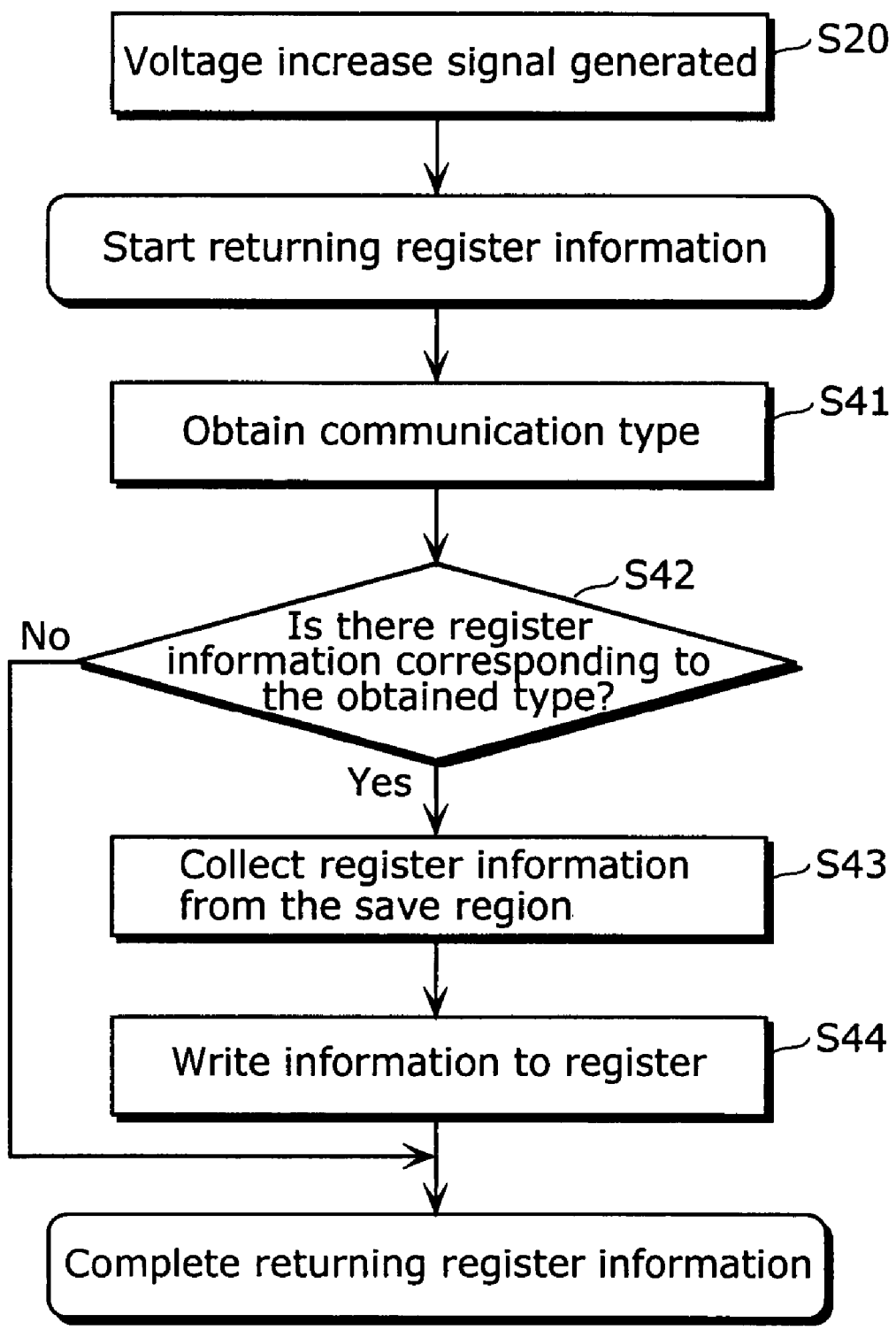
FIG. 12 is a flowchart showing a procedure for returning register information using communication type in the IC card according to the second embodiment.

FIG. 12 is a flowchart showing a procedure for returning the register information using the communication type in the IC card 100 according to the second embodiment.

With reference to FIG. 12, the operations of the IC card 100 when returning the register information 420 based on the judgment of communication type is described. With the series of operations described with reference to FIG. 11, the following is described assuming a case where the register information 420 is written on the save region 901.

The IC card 100 moves to the area 703 where the IC card 100 can communicate with the reader/writer 700. The voltage detection unit 300 of the IC card 100 detects a status that the supplied voltage is higher than the threshold value Vh for time Δt after entering the area 703.

When the voltage increase is detected, the voltage detection unit 300 sends a signal for notifying voltage increase to the save unit 302 (S20).

With the generation of the voltage increase signal, return of the register information 420 is started. More specifically, first, the communication type obtainment unit 800 obtains a communication type used for the communication with the reader/writer 700 (S41).

The reader/writer 700 is a terminal which relays communication with the server 702 that provides public-related services and the IC card 100, and the communication protocol is Type B. Accordingly, the communication type obtainment unit 800 obtains "Type B". The communication type obtainment unit 800 matches Type B and the "Public AP" which is a matching program type, and notifies the information indicating "Public AP (Type B)" to the return unit 303.

The return unit 303 confirms whether or not the register information 420 with "Public AP (Type B)" is stored in the first save region 901 or the second save region 902.

In the second embodiment, the register information 420 stored in the first save region 901 includes "Transportation AP (Type C)". Accordingly, it is determined that there is no register information to return (No in S42). When it is judged that there is no register information to return, the operation for returning the register information is completed.

Subsequently, a program corresponding to the public-related service is activated, and processing is started. When the IC card 100 moves to the non-communication area before the completion of the processing, processing is interrupted, and the register information is saved to the FeRAM 202. Here, in the first save region 901 of the FeRAM 202, the register information 420 corresponding to the communication with the server 104 is stored. Thus, the register information corresponding to the communication with the server 702 is saved on the second save region 902.

As described above, operations in the case where the IC card 100 is moved to the area 112 when the register information 420 corresponding to the communication with the server 104 is stored in the first save region 901, and the register information corresponding to the communication with the server 702 is stored in the second save region 902 is described with reference to FIG. 12.

The voltage increase signal is generated when a predetermined status of voltage increase is detected in the voltage detection unit 300 of the IC card 100 (S20). Thus, processing for returning the register information 420 starts as described below.

The communication type obtainment unit 800 obtains communication type used for the communication with the reader/writer 102. The reader/writer 102 is a terminal which relays communication between the server 104 which provides public-related services and the IC card 100, and the communication protocol is Type C. Accordingly, the communication type obtainment unit 800 obtains "Type C". The communication type obtainment unit 800 matches Type C and a corresponding program type, and notifies the information showing "Transportation AP [Type C]" to the return unit 303.

The return unit 303 checks whether or not the register information 420 with "Transportation AP [Type C]" is stored in the first save region 901 or the second save region 902.

In the second embodiment, there is register information 420 with "Transportation AP [Type C]", in other words, register information to return in the first save region 901 (Yes in S42), the return unit 303 collects the register information 420 from the first save region 901. Furthermore, the collected register information 420 is written on the register 205 (S44).

Note that when it is judged that there is no register information to return, the operation for the register information is completed.

With the series of operations above, the IC card 100 can resume processing in response to the traffic-related service which is interrupted when leaving the area 110. The IC card 100 completes the series of processing after sending program execution results using the returned register information 420 to the server 104 via the reader/writer 102.

Note that the register information stored in the second save region 902 returns to the register 205 when the IC card 100 moves to an area where the IC card 100 can communicate with the server 702, such as the area 703. Furthermore, with this register information, processing in accordance with the public services can resume. The operation of the IC card 100 when the processing resumes, is the same operations as to when processing corresponds to the transportation-related services resumes.

As described above, the IC card 100 according to the second embodiment can resume, in the same manner as the IC card 100 according to the first embodiment, the interrupted processing in the same status at the point of the interruption. In other words, it is possible to continue processing. In addition, in the IC card 100 according to the second embodiment, two individual pieces of register information can be stored separately, and information based on communication type is added to each piece of register information.

Thus, register information corresponding to the program to be activated can be selected properly and returned when voltage supply resumes. In addition, in the case where the register information saved to the FeRAM 202 does not match the program to be activated, the register information remains in the FeRAM 202. With this, interrupted processing can be held at a point in time when the processing is interrupted. In addition, it is possible to respectively maintain two independent processing in the statuses when each of the processing is interrupted. Thus, each processing can be intermittently performed.

Note that in the second embodiment, a case where intermittent processing corresponding to transportation-related services and public-related services are respectively performed by the IC card 100 is described.

However, the content which the IC card 100 processes is not limited to the type of services such as transportation and the like, and three or more individual processing may be performed.

In this case, the IC card 100 may include programs to be executed for the processing, and the FeRAM 202 may include as many save regions as necessary. Thus, more individual processing can be intermittently performed.

In addition, it is noted that the communication type obtainment unit 800 notifies the obtained communication type corresponding to the program type to the save unit 302 and the return unit 303, associating the obtained communication type with the program type. However, communication type may only be notified. To put it differently, if processing is to resume, more specifically, a program to be activated is identified, only communication type may be notified.

In addition, the communication type obtainment unit 800 may notify communication type which can be judged when receiving electric supply in advance, and subsequently notify the program type when needed. In this case, for example, if the communication type of the newly started communication is "Type B", and the saved register information 420 is associated with "Type C", it can be determined that the return processing of the register information 420 is unnecessary. In other words, there is a case where no analysis is necessary to determine the program type, and in such a case, processing speed for returning the register information can be improved.

In addition, the communication type obtainment unit 800 may confirm the existence of the register information to return or select the register information using information other than communication type. In other words, information other than communication type may be used if the program which the execution is interrupted and to be resumed can be specified.

FIG. 13 is a diagram showing an example of available information type for identifying register information to return. Each piece of information shown in FIG. 13, or information that is combination of the information is an example of additional information of the semiconductor memory card according to the present invention.

As shown in FIG. 13, information used for identifying the register information to return may be information other than Transport Type indicating communication protocol which is communication type.

For example, Transport info length indicating communications protocol length which is information for identifying communications protocol, or Transport Information indicating information regarding communications protocol maybe used, not the communications protocol itself.

In addition, an Application ID indicating an identifier of an application program, an Application Type indicating type of an application, and Resume Version which is information for managing versions of processing which repeats interruption and resuming multiple times.

The IC card 100 according to the second embodiment includes the communication type obtainment unit 800 for obtaining communication type. However, when information other than communication type is obtained and used, the IC card 100 may include an obtainment unit for obtaining other information instead of, or in addition to the communication type obtainment unit 800. For example, in the case where Application ID is used, the IC card 100 may include an ID obtainment unit for obtaining an Application ID from communication with the reader/writer, or from the program itself which is being executed.

The save unit 302, when the voltage detection unit 300 receives the voltage decrease signal, saves the register information in the FeRAM 202, adding an Application ID for specifying program being executed obtained by the ID obtainment unit to the register information. Subsequently, the return unit 303 receives voltage increase signal from the voltage detection unit 300 and the Application ID obtained by the ID obtainment unit from the communication with the reader/writer. The return unit 303 reads out the received register information with an Application ID from the FeRAM 202, and returns to the register 205.

The returned register information corresponds to the program to be activated, and the interrupted processing resumes using the register information.

As described above, even in the case where information other than communication type is used, the interrupted processing can be resumed. In other words, processing can be intermittently performed.

In addition, instead of directly adding each of the pieces of information shown in FIG. 13, other pieces of information in association with the information may be added. For example, a program name corresponding to the Application ID may be added instead of directly adding the Application ID to the register information. In this case, the coordination may be stored in a predetermined region of the FeRAM 202. To put it differently, the IC card 100 can judge whether or not the information obtained from the communication with the reader/writer is substantially included in the information added to the register information 420.

In addition, plural types of information in combination may be added to the register information 420. In this case, the IC card 100 may obtain the plural types of information from the detail of communication with the reader/writer, and further return the register information 420 with all types of information obtained. Thus, for example, specification of the register information 420 to return can be performed more precisely.

Third Embodiment

As a third embodiment, a configuration for improving security of the IC card 100 according to the first and second embodiments is described. By improving security of the IC card 100, processing of highly confidential information can be intermittently performed with higher security. It is noted that the specific description and illustration is made based on the IC card 100 according to the second embodiment. It is also noted that the use environment of the IC card 100 according to the third embodiment is same as the use environment of the first and the second embodiments.

Figure 14:
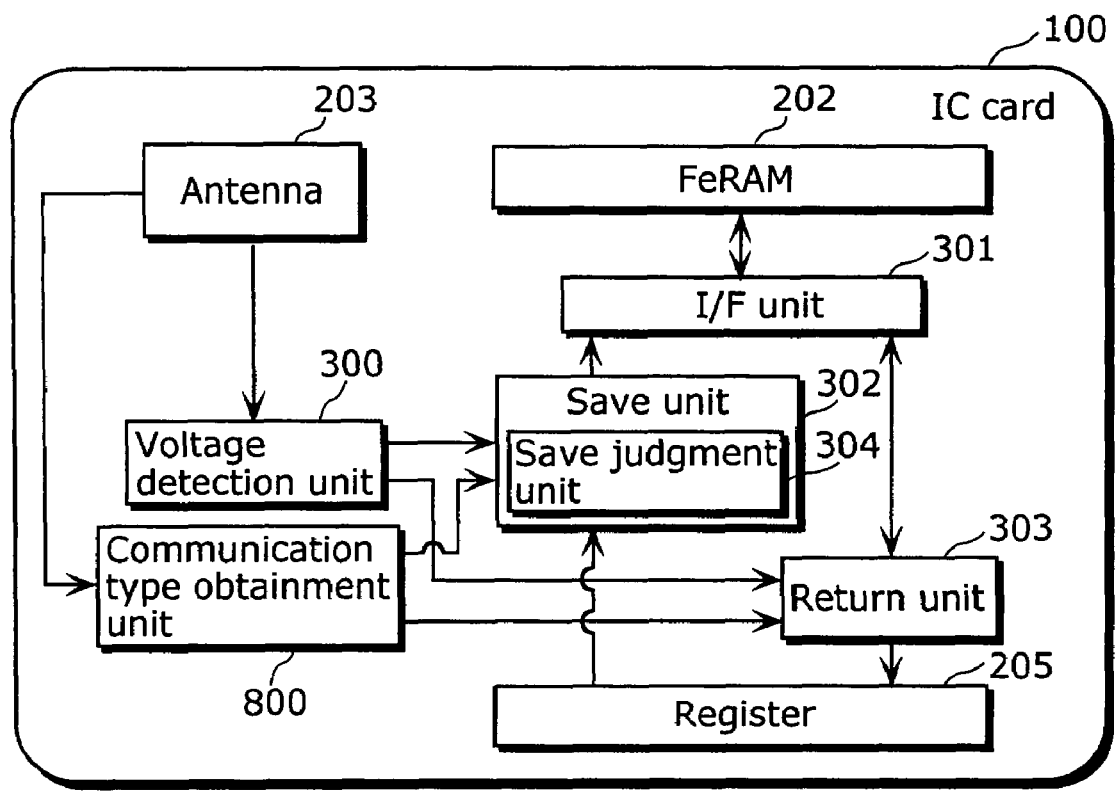
FIG. 14 is a functional block diagram showing a functional configuration of an IC card according to the third embodiment.

FIG. 14 is a functional block diagram showing a functional configuration of the IC card 100 according to the third embodiment.

As shown in FIG. 14, the IC card 100 according to the third embodiment includes: the antenna 203 which is an I/F for external communication; the voltage detection unit 300 which detects supply voltage change; the save unit 302 which saves the register information to the FeRAM 202 based on the voltage decrease signal generated from the voltage detection unit 300; the return unit 303 for returning the saved register information to the register 205; the I/F unit 301 which intermediates information exchange between the save unit 302, the return unit 303 and the FeRAM 202; the FeRAM 202, a non-volatile memory which stores register information; and the communication type obtainment unit 800 which obtains communication type in the communication with the reader/writer.

The FeRAM 202 is configured of a destructive readout region and a non-destructive readout region. The destructive readout region is a region where data being read out is not supplemented after data readout, and no data is left in the region. The configuration of the FeRAM 202 will be described with reference to FIG. 17.

In addition, the save unit 302 incluthedes a save judgment unit 304. The save judgment unit 304 is a processing unit for determining the register information to be saved either in the destructive readout region or the non-destructive readout region based on the encryption information used by the encryption.

As described above, the IC card 100 according to the third embodiment includes a save judgment determination unit 304 as a characteristic component, in addition to the components included in the IC card 100 according to the second embodiment.

The save judgment unit 304 saves the register information to the destructive readout region of the FeRAM 202, when an encryption strength used by the program of which execution is to be interrupted, is equal to or higher than a predetermined encryption strength.

The encryption strength equal to or higher than the predetermined strength implies high confidentiality of data handled by the program. Thus, the register information is saved to the destructive readout region. With this, risk of the register information possibly of high confidentiality being read out of the IC card 100 can be reduced. In other words, it is possible to improve the security of the IC card 100.

In the present embodiment, Conditional Access (CA) Type which is information indicating encryption scheme is used as information to specify encryption strength.

FIG. 15 is a diagram showing three types of information related to encryption. CA Type is an example of the encryption information according to the semiconductor memory card of the present invention, and is information indicating encryption strength. More specifically, CA Type specifies the kind of CA, indicating encryption scheme, and encryption strength is also specified by the kind of CA. CA Key length is information indicating key length used for encryption, and CA Key is information indicating the key itself.

FIG. 16 is a diagram showing types of CA Type. Representative examples of CA Types include M_CA_DES indicating the Single Data Encryption Standard (Single DES) method, M_CA_3DES indicating the Triple DES (3DES) method, and M_CA_RSA indicating the RSA method. The strength of the encryption schemes increase in an order of Single DES, 3DES, and RSA. It should be noted that NO_USE is a CA Type indicating indicates no encryption, more specifically, the program for executing processing does not use encryption.

Values shown in FIG. 16 are respectively allocated to the CA types, and the program to be executed in the IC card 100 includes these values. The save judgment unit 304 in the IC card 100 shown in FIG. 14 reads, when saving the register information, these values out of the program of which execution is to be interrupted, and specifies an encryption scheme used by the program. Furthermore, in the third embodiment, the register information is saved to the destructive readout region in the FeRAM 202 in the case where the encryption strength is higher than the encryption strength of 3DES.

To put it differently, if the encryption scheme used by the program of which execution is interrupted is either 3DES or RSA, the save unit 302 saves the register information to the destructive readout region in the FeRAM 202 after the judgment by the save judgment unit 304.

Figure 17:
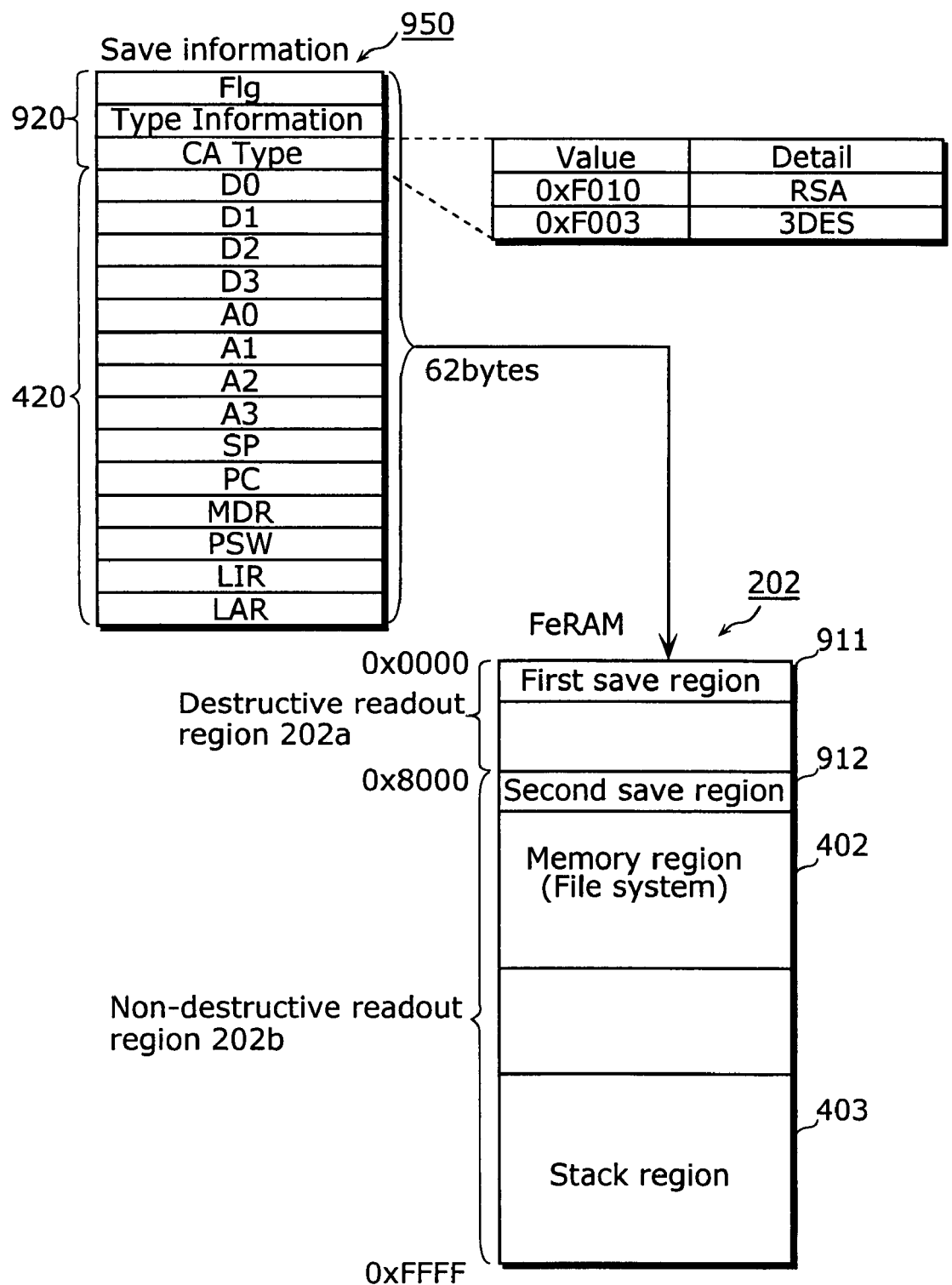
FIG. 17 is a diagram showing an example of data configuration of save information and an example of FeRAM memory map according to the third embodiment.

FIG. 17 is a diagram showing an example of data configuration of save information and an example of a memory map of the FeRAM 202 according to the third embodiment.

The save information 950 is information which is saved to the FeRAM 202 by the save unit 302, and as shown in FIG. 17, is information in association with an identification information 920 including a flag value, Type Information, CA type and the register information 420 which is a group of data collected from the register 205.

The flag value is a value indicating "saved data" or "no saved data" as described in the first and the second embodiments, and is set to a value indicating "saved data" when saved to the FeRAM 202.

Type Information is, information for specifying a program that performs processing using the register information 420, and is information based on communication type as described in the second embodiment.

CA Type is, as described above, information indicating an encryption scheme used by the program of which execution is interrupted. A value indicating no encryption, Single DES, 3DES, or RSA is read out from the program by the save judgment unit 304, and added to the register information 420 as CA Type.

As shown in FIG. 17, the FeRAM 202 is configured of a destructive readout region 202a and a non-destructive readout region 202b. The destructive readout region 202a includes a first save region 911, and the non-destructive readout region 202b includes a second save region 912, a memory region 402, and a stack region 403.

FIG. 18 is a chart showing addresses of the destructive readout region 202a and the non-destructive readout region 202b of the FeRAM 202 in the third embodiment. As shown in FIG. 18, the destructive readout region 202a and the non-destructive readout region 202b respectively exist on sequential addresses of the memory space in the FeRAM 202.

As described above, if a CA type added to the register information 420 indicates 3DES or RSA, the register information 420 is saved to the first save region 911 in the destructive readout region 202a. In addition, if the CA Type is a value which indicates other than 3DES or RSA, the register information 420 is saved to the second save region 912 in the non-destructive readout region 202b.

Figure 19:
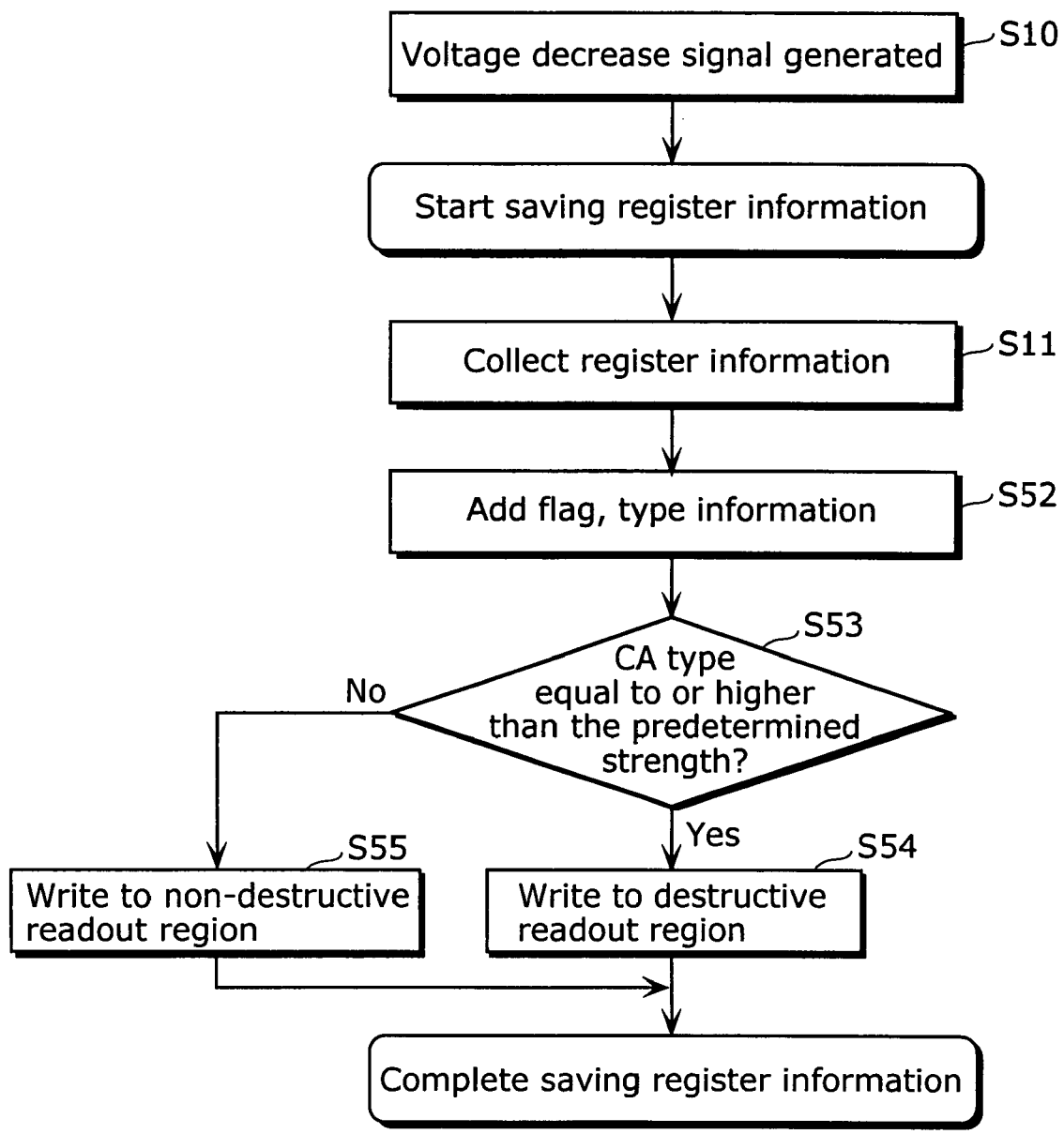
FIG. 19 is a flowchart showing a procedure for saving register information in the IC card according to the third embodiment.

FIG. 19 is a flowchart showing a procedure for saving the resister information 420 so that the processing is interrupted in progress when the voltage detection unit 300 detects a predetermined status of voltage decrease.

With reference to FIG. 19, operations of the IC card 100 according to the third embodiment when saving the register information 420 is described.

As well as the first and second embodiments, the voltage detection unit 300 detects a predetermined status of voltage decrease, and generates voltage decrease signal (S10). With this, saving of the register information is started, and the save unit 302 collects the register information 420 from the register 205 (S11).

The save judgment unit 304 reads out CA Type from the program of which execution is to be interrupted. The save unit 302 further adds a flag value indicating "saved data" and a communication type obtained by the communication type obtainment unit 800, and CA Type indicating an encryption scheme to the register information 420 (S52).

The save judgment unit 304 judges a region to save the register information 420 based on whether or not the encryption strength of the encryption scheme specified by the CA Type being read out is equal to or higher than a predetermined strength.

More specifically, in the case where the encryption scheme is 3DES or RSA (YES in S53), it is judged that the register information 420 is to be saved to the first save region 911 in the destructive readout region 202a of the FeRAM 202. The save unit 302 saves the register information 420 with a flag value and so on, in the first save region 911 in accordance with the judgment (S54).

Furthermore, in the case where the encryption scheme is other than 3DES or RSA, or no encryption scheme being used (No in 553), it is judged that the register information 420 is saved to the second save region 912 in the non-destructive readout region 202b in the FeRAM 202. The save unit 302 saves the register information 420 with a flag value and so on, in the second save region 912 in accordance with the judgment (S55).

With the series of operations, the register information related to the program being executed is saved to the FeRAM 202 which is a non-volatile memory.

The IC card 100, as described in the first and second embodiments, can intermittently perform each of plural processing, and the FeRAM 202 can store plural pieces of register information. Furthermore, in the third embodiment, it is possible to specify the encryption strength of the program prior to saving the register information, and preferentially save the register information with high encryption strength, and assumed to be of high importance.

In general, when an IC card starts communication with the reader/writer in general, authentication processing with encryption processing is performed between the IC card and the reader/writer. Note that the information for authentication processing including information for the encryption processing is included in the register information. Thus, it is beneficial for improving security of the IC card 100 to save the register information to the destructive readout region 202a.

Note that, in the third embodiment, CA Type is added to the register information 420 when saving the register information 420, however, CA Type may not be added. Before saving the register information 420, the save judgment unit 304 may judge a region to save the register information 420 based on the CA type, the CA type may be scrapped after the judgment.

In addition, the saved CA Type being added to the register information 420 may be used when returning the register information 420. For example, when returning the register information, in the case where the added CA type shows that the encryption strength is higher than 3DES, the register information may be returned after authentication of the reader/writer is performed.

A configuration in order to use CA Type when returning the register information 420 will be described in the fourth embodiment.

In addition, in the case where the encryption strength specified by CA Type is equal to or higher than the predetermined strength, it is noted that the register information is saved to the first save region 911 in the destructive readout region 202a in the FeRAM 202.

However, in the case where, for example, the first save region 911 is large enough, the register information may always be saved to the first save region 911. Alternatively, the register information may generally be saved to the first save region 911, while the register information with high confidentiality may be saved to the first save region 911 after a judgment based on the aforementioned CA Type, only in the case where the remaining amount of the first save region 911 falls below the predetermined amount. As described above, security can be improved in accordance with the resource of the IC card 100.

Although CA Type is used for judging the save region to be used for saving, information other than CA Type may also be used. For example, CA Key length shown in FIG. 15 may be used as well. CA Key length is information indicating length of a key, and the longer the key length is, the higher the encryption strength becomes. Thus, when a CA Key length is equal to or longer than a predetermined length, corresponding register information may be saved to the destructive readout region 202a. Furthermore, by combining the information, judgment whether or not the register information is saved to the destructive readout region 202a may be performed.

Although it is noted that in the case where CA Type is 3DES or RSA, the register information is saved to the destructive readout region 202a, other judgment criteria may also apply. For example, the register information is saved to the destructive readout region 202a only in the case where CA Type is RSA. In addition, if CA Type indicates an encryption scheme of the encryption strength higher than DES, for example, the register information may be saved to the destructive readout region 202a.

In addition, it may not be after flag value or the like is added to the register information that the save judgment unit 304 judges whether or not an encryption strength specified by the CA type is equal to or higher than a predetermined strength. For example, the judgment may be performed before the generation of voltage decrease signal from the voltage detection unit 300. In this case, the judgment result may be stored in the predetermined memory region. Prior to saving the register information, a judgment whether or not the register information is saved to the destructive readout region 202a may be able to made using the judgment result.

Thus, in accordance with the user's usage mode of the IC card 100 and the type of program to be executed and the like, type of information and judgment criteria used for judgment whether or not the register information is to be saved to the destructive readout region 202a may be changed. Furthermore, the processing order may be an order other than the order described in the present embodiment. With this, for example, measures for security can be taken in accordance with the confidentiality of information used in the IC card 100. In addition, with these modifications, the characteristic of the IC card 100 which processing can be executed intermittently is not lost.

Fourth Embodiment

In the third embodiment, the configuration for improving the security of the IC card 100 of the first and second embodiments using information indicating encryption strength when saving register information is described.

In the fourth embodiment, a configuration for improving security of the IC card 100 by using information indicating the encryption strength when returning the register is described.

In other words, in the IC card 100 of the fourth embodiment, processing of highly confidential information can be intermittently performed with higher security in the same manner as described in the third embodiment.

Note that the specific description and illustration is made based on the IC card 100 according to the second embodiment. In addition, the use environment of the IC card 100 according to the fourth embodiment is the same as the first and the second embodiments.

Figure 20:
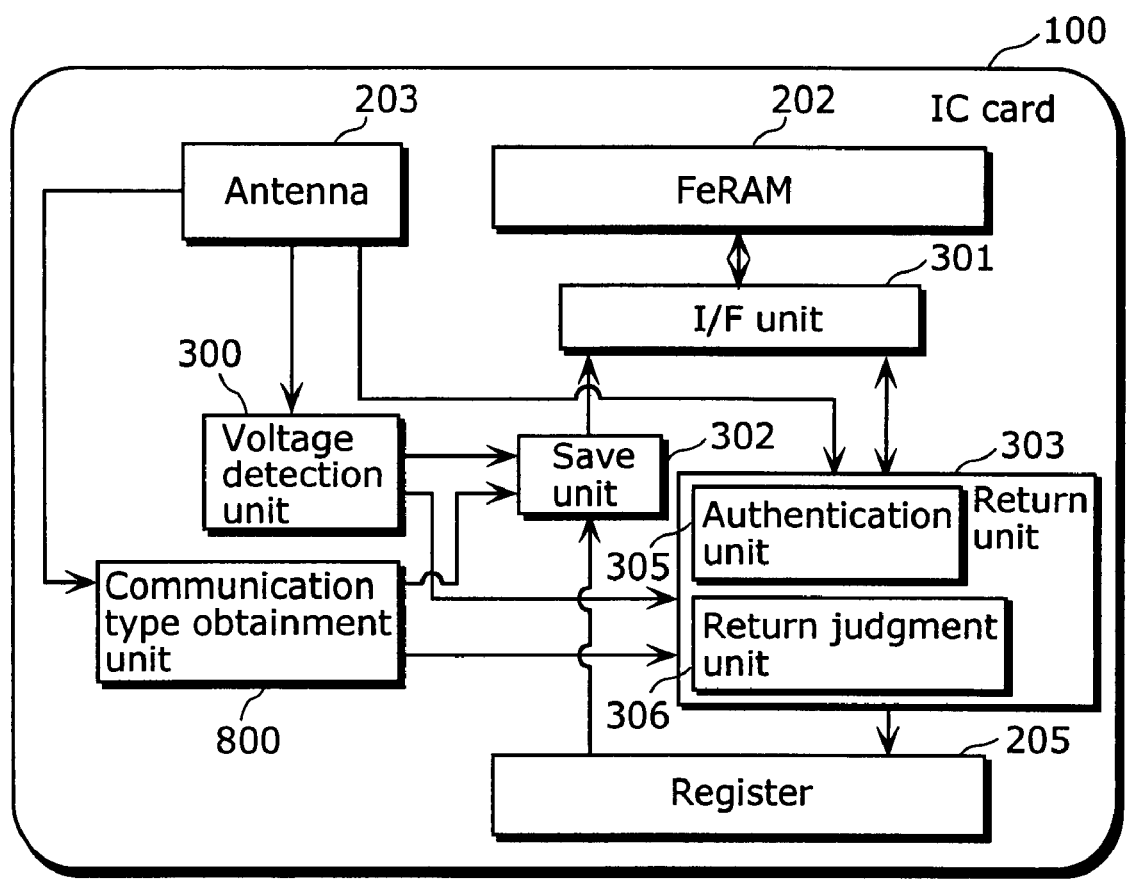
FIG. 20 is a functional block diagram showing a functional configuration of an IC card according to the fourth embodiment.

FIG. 20 is a functional block diagram showing a functional configuration of the IC card 100 according to the fourth embodiment.

It is assumed that, in the FeRAM 202, the register information 420 with CA Type shown in FIG. 17 is stored. CA Type is obtained from the program of which the execution is to be interrupted, and added to the register information.

As shown in FIG. 20, the IC card 100 according to the fourth embodiment includes: the antenna 203 which is an I/F for external communication; the voltage detection unit 300 which detects supply voltage change; the save unit 302 which saves register information to the FeRAM 202 based on the voltage decrease signal generated from the voltage detection unit 300; the return unit 303 which returns the saved register information to the register 205; the I/F unit 301 which intermediates information exchange between the save unit 302, the return unit 303 and the FeRAM 202; the FeRAM 202, a non-volatile memory which stores register information; and the communication type obtainment unit 800 which obtains communication type in the communication with the reader/writer.

In addition, the return unit 303 includes a authentication unit 305 and a return judgment unit 306. The return judgment unit 306 is a processing unit which judges whether or not authentication processing is performed, based on the CA Type added to the register information and saved to the FeRAM 202. The authentication unit 305 is a processing unit which performs authentication processing with a reader/writer according to the judgment by the return judgment unit 306.

As described above, the IC card 100 according to the fourth embodiment includes, an authentication unit 305 and a return judgment unit 306 as characteristic component, in addition to the components included in the IC card 100 according to the second embodiment.

The return judgment unit 306 specifies encryption strength from the CA Type added to the register information to return. If the specified encryption strength is equal to or higher than the predetermined strength, the authentication unit 305 performs authentication of the reader/writer. The return unit 303 returns the register information only in the case where the authentication by the authentication unit 305 is successful.

More specifically, in the present embodiment, authentication of the reader/writer is performed in the case where the encryption scheme indicated by the CA Type is 3DES or RSA. Note that, an IC card and a reader/writer in general execute processing for mutual authentication when starting communication. In the IC card 100, authentication is performed when starting communication with the reader/writer. Furthermore, prior to the processing interruption, information regarding authentication processing is also included in the register information and saved. Thus, it is possible to resume interrupted processing using information included in the saved register information regarding authentication without another authentication.

However, the IC card 100 according to the fourth embodiment performs authentication in the case where the CA Type added to the register information indicates an encryption scheme equal to or higher than the predetermined strength. Only when the authentication is successful, in other words, when the authenticity of reader/writer is confirmed, the register is returned. With this, the security of the IC card 100 can be improved.

Note that the configuration unit for performing authentication with the reader/writer is basically equipped in the IC card, and are equipped in the IC card 100 according to the first to third embodiments, although illustration and description are omitted.

Figure 21:
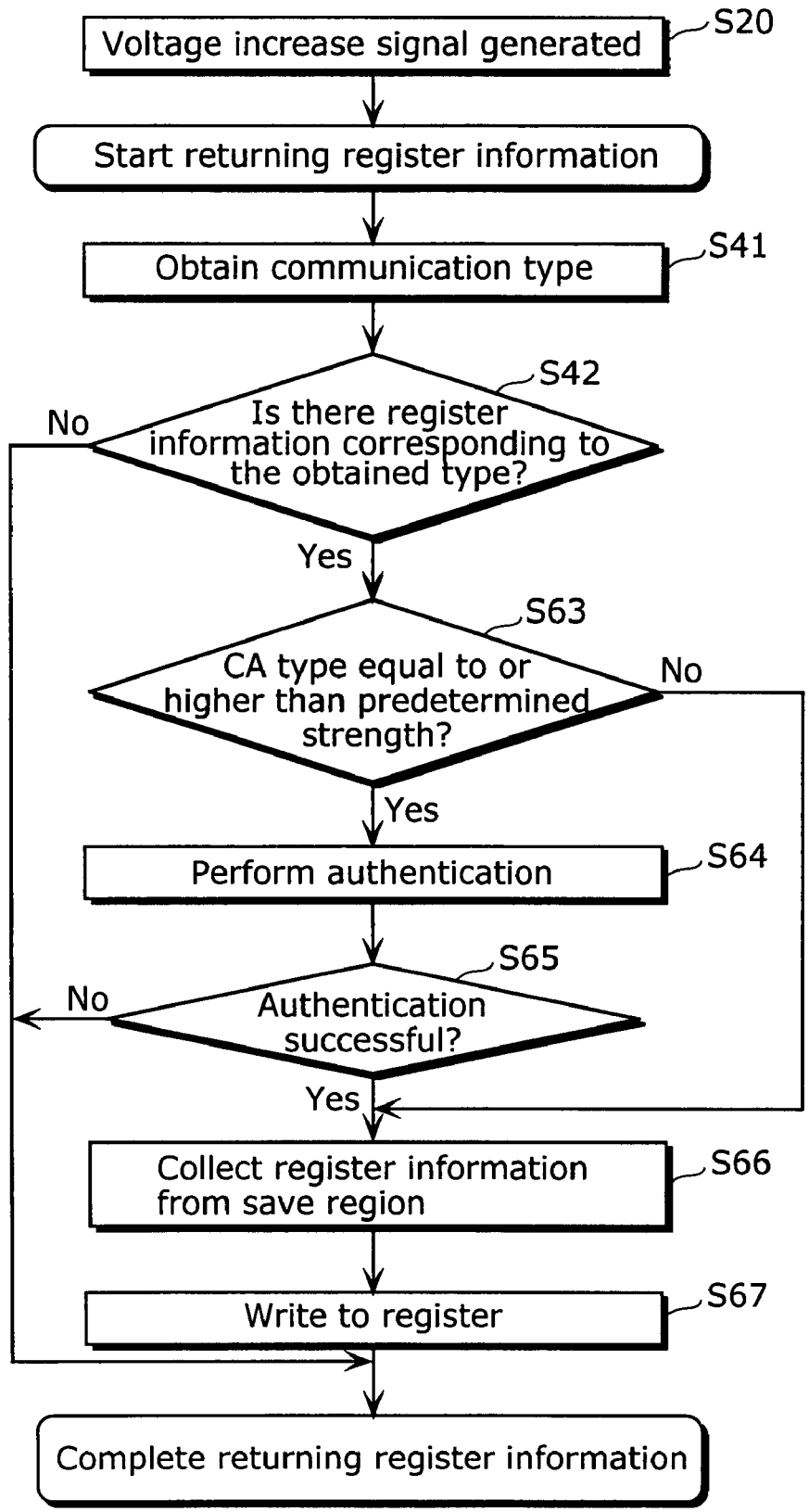
FIG. 21 is a flowchart showing a procedure for returning register information using CA type in the IC card according to the fourth embodiment.

FIG. 21 is a flowchart showing a procedure for returning register information using CA type in the IC card 100 according to the fourth embodiment.

With reference to FIG. 21, the operations of the IC card 100 when returning the register information 420 by a judgment based on the CA Type is described.

As well as the first and second embodiments, the voltage detection unit 300 detects a predetermined status of voltage increase, and generates a voltage increase signal (S20). With this, return of the register information is started, and firstly, the communication type obtainment unit 800 obtains a type of communication used for the communication with the reader/writer 700 (S41). The return unit 303 checks whether or not the flag value is a value indicating "saved data" and the register information 420 corresponding to the obtained communication type is stored in the FeRAM 202.

In the case where the register information 420 satisfying the abovementioned conditions is stored (Yes in S42), the return judgment unit 306 refers to the CA Type added to the register information 420, and checks whether or not the CA Type is a value indicating 3DES or RSA. In the case where the value indicates 3DES or RSA (Yes in S63), the return judgment unit 306 instructs authentication processing to the authentication unit 305.

The authentication unit 305 authenticates the reader/writer (S64). When the authentication is successful (Yes in S65), the return unit 303 collects the register information 420 from the FeRAM 202 (S66), and writes the register information to the register 205 (S67).

With the series of operations, the register information 420 returns to the register 205, and the processing resumes.

Note that, in the case where the register information 420 to be returned is not stored in the FeRAM 202 (No in S42), or in the case where the authentication by the authentication unit 305 is not successful (No in S65), the register information does not return and operation for the return of the register information is completed.

Furthermore, although the register information 420 to be returned is stored in the FeRAM 202 (Yes in S42), but when the CA Type added to the register information is not a value indicating 3DES or RSA, authentication is not performed and proceeds to the collection of the register information 420 (S66). The same applies to the case where the CA Type is not added to the register information 420.

As described above, the IC card 100 according to the fourth embodiment specifies an encryption strength from the CA Type added to the register information when resuming the interrupted processing, in other words, when returning the saved register information. In the case where the specified encryption strength is equal to or higher than the predetermined strength, the authentication unit 305 authenticates the reader/writer. When the authentication is successful, in other words, when authenticity of the reader/writer, the communication counterpart, is confirmed, the register information is returned.

In the case where the CA Type is a value indicating RSA, the register information with the CA Type is considered to be highly confidential information. Thus, the IC card 100 returns the register information and resumes processing after confirming authenticity of the reader/writer which is the communication counterpart. With this, it is possible to prevent unauthorized readout or use of the register information. To put it differently, it is possible to improve the security of the IC card 100.

It should be noted that, although CA Type is used for the judgment whether or not reader/writer authentication is performed before resuming the processing, information other than CA Type may also be used. For example, the CA Key length shown in FIG. 15 may be used. As described in the third embodiment, the CA Key length is information indicating a key length, and the longer the key length is, the higher the encryption strength becomes. Thus, in the case where the CA Key length added to the register information to return indicates a key length is equal to or longer than a predetermined length, the authentication processing described above may be performed. Furthermore, the information may be added and saved to the register information in combination, and whether or not the authentication processing is performed may be judged based on the combined information.

In addition, although it is noted that the authentication of the reader/writer is performed in the case where the CA type is 3DES or RSA, other criteria may be used for the judgment. For example, authentication may be performed only when the CA Type is RSA, or authentication may be performed when the CA Type indicates an encryption scheme with higher encryption strength than the DES. In addition, the authentication of the reader/writer may always be performed prior to resuming the processing, regardless of the CA Type.

As described above, type of information and judgment criteria used to determine whether or not the authentication prior to resuming the processing may differ from the type of the information and the judgment criteria used in the fourth embodiment. With this, for example, measures for security can be taken in accordance with the confidentiality of the information handled by in the IC card 100. In addition, with these modifications, the characteristics of the IC card 100 which processing can be intermittently executed is not impaired.

Furthermore, the characteristics of the IC card 100 according to the third embodiment may be added to the characteristics of the IC card 100 according to the fourth embodiment. More specifically, the save judgment unit 304 in the IC card 100 according to the third embodiment shown in FIG. 14 may be added to the configuration of the IC card 100 according to the fourth embodiment shown in FIG. 20.

In this case, the FeRAM 202 includes a destructive readout region 202a shown in FIG. 17, and may include a region for saving the register information therein.

With this, in the IC card 100, authenticity of the communication counterpart is confirmed before resuming the processing. The resister information used for the processing does not remain in the FeRAM 202 after the processing resumes. This enables enhanced protection of register information assumed to be of high confidentiality, and thus the security of the IC card can further be improved.

First Supplementary Item of the First to Fourth Embodiments

The first to fourth embodiments are described above. Note that each of the voltage detection unit 300, the save unit 302, the I/F unit 301, the return unit 303, the communication type obtainment unit 800, the save judgment unit 304, the authentication unit 305 and the return judgment unit 306 is realized as a computer program. Some of the programs are stored and executed in the ROM of the IC card 100 while other programs are externally downloaded, and stored and executed in the FeRAM 202.

Second Supplementary Item of the First to Fourth Embodiments

Furthermore, functional blocks such as the voltage detection unit 300 and so on can be realized as a LSI which is an integrated circuit in combination with hardware resources such as CPU, RAM, ROM, and non-volatile memory and the like. These blocks can be integrated separately, or a part or all of them can be integrated into a single chip.

Figure 22:
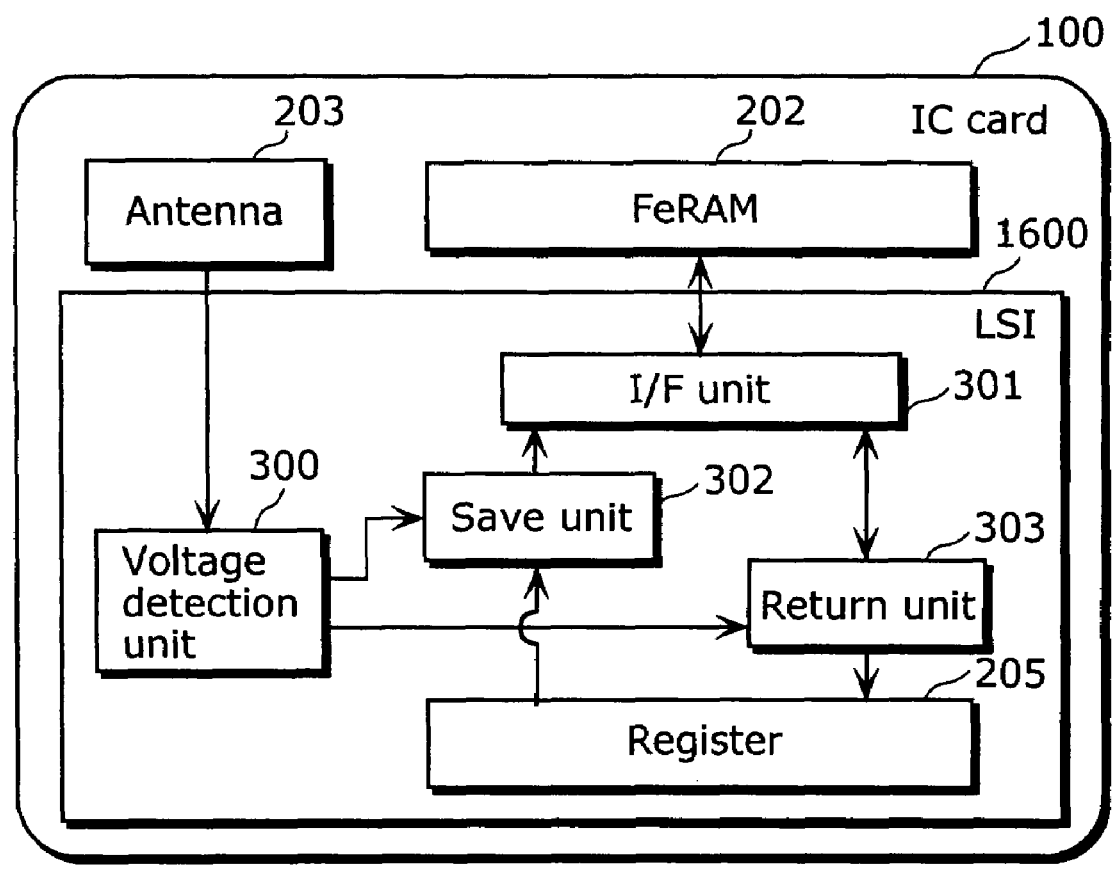
FIG. 22 is a diagram showing an example of integrated circuit in the IC card of the first embodiment.

FIG. 22 is a diagram showing an example in which the IC card 100 according to the first embodiment is implemented in integrated circuit form. An LSI 1600 shows an example of an integrated circuit, and is an example showing a range of the functional blocks to be integrated as an integrated circuit. The LSI here can be referred to as an IC, a system LSI, a super LSI, or an ultra LSI, depending on their degrees of integration.

An integrated circuit used for such an embodiment is not limited to an LSI, and it may be embodied as a dedicated circuit or a general-purpose processor. It is also possible to use a field programmable gate array (FPGA) which can be programmed in the field after manufacturing an LSI, or a reconfigurable processor in which connection and setting of circuit cells inside an LSI can be reconfigured.

Furthermore, when a technology for the integrated circuit replacing LSI is developed with the advance of semiconductor technology or relevant technology, functional blocks can be integrated using the technology. Possible field of technology to be applicable include, for example, bio technology and organic chemistry technology and others.

In addition, in each of the IC cards 100 in the second to fourth embodiments, a part or all of the functional blocks included in the IC card 100 may be put together as an integrated circuit.

INDUSTRIAL APPLICABILITY

The semiconductor memory card according to the present invention is useful as a semiconductor memory card with a function for executing a program, and is particularly useful as an IC card which can execute plural programs.

The invention claimed is:

1. A semiconductor memory card which can execute a program, the memory card comprising:
   a non-volatile memory which stores information;
   a register which stores information regarding the program being executed;
   a detection unit operable to detect a change in supply voltage to the semiconductor memory card;
   a save unit operable, when the detection unit detects a predetermined decrease of the supply voltage, to associate the information stored in the register with additional information for specifying the program, and to save the information stored in the register and the additional information to the non-volatile memory, the additional information including information that is obtainable by a communication performed through an execution of the program between the semiconductor memory card and another device; and
   a return unit operable to return the information stored in the register to the register when the detection unit detects a predetermined increase of the supply voltage and when the additional information stored in the non-volatile memory satisfies a predetermined condition.

2. A semiconductor memory card according to claim 1, further comprising a communication unit operable to communicate with the other device,
   wherein the return unit is operable to return the information stored in the register to the register when the detection unit detects the predetermined increase of the supply voltage, and when the additional information includes information obtained through a communication between the communication unit and the other device.

3. A method for intermittently executing a program in a semiconductor memory card which can execute a program, the semiconductor memory card including a non-volatile memory which stores information and a register which stores information regarding the program being executed, and the program execution method comprises:
   a detection step of detecting a change in supply voltage to the semiconductor memory card;
   a save step of, when predetermined decrease of the supply voltage is detected, associating the information stored in the register with additional information for specifying the program and saving the information stored in the register and the additional information to the non-volatile memory, the additional information including information that is obtainable by a communication performed through an execution of the program between the semiconductor memory card and another device; and
   a return step of returning the information stored in the register to the register when a predetermined increase of the supply voltage is detected in the detection step, and when the additional information stored in the non-volatile memory satisfies a predetermined condition.

4. An execution program recorded on a computer-readable recording medium for intermittently causing a semiconductor memory card to execute the application program stored in a semiconductor memory card which can execute the application program, the semiconductor memory card including a non-volatile memory which stores information and a register which stores information regarding an application program being executed, the execution program is a program causing a computer to execute the following steps:
   a detection step of detecting a change in supply voltage to the semiconductor memory card;
   a save step of, when predetermined decrease of the supply voltage is detected, associating the information stored in the register with additional information for specifying the program and saving the information stored in the register and the additional information to the non-volatile memory, the additional information including information that is obtainable by a communication performed through an execution of the program between the semiconductor memory card and another device; and
   a return step of returning the information stored in the register to the register when a predetermined increase of the supply voltage is detected in the detection step, and when the additional information stored in the non-volatile memory satisfies a predetermined condition.

5. A computer-readable storage medium, in which an execution program for intermittently executing an application program in a semiconductor memory card which can execute the application program, the semiconductor memory card including a non-volatile memory which stores information and a register which stores information regarding application program being executed, the storage medium stores an execution program causing the memory card to execute the following steps:
   a detection step of detecting a change in supply voltage to the semiconductor memory card;
   a save step of, when a the predetermined decrease of the supply voltage is detected, associating the information stored in the register with additional information for specifying the program and saving the information stored in the register and the additional information to the non-volatile memory, the additional information including information that is obtainable by a communication performed through an execution of the program between the semiconductor memory card and another device; and
   a return step of returning the information stored in the register to the register when a predetermined increase of the supply voltage is detected in the detection step, and when the additional information stored in the non-volatile memory satisfies a predetermined condition.

6. An integrated circuit for intermittently executing a program in a semiconductor memory card which can execute a program, the semiconductor memory card including a non-volatile memory which stores information, the integrated circuit includes:
   a register which stores information regarding the program being executed;
   a detection unit operable to detect a change in supply voltage to the semiconductor memory card;
   a save unit operable, when the detection unit detects a predetermined decrease of the supply voltage, to associate the information stored in the register with additional information for specifying the program, and to save the information stored in the register and the additional information to the non-volatile memory, the additional information including information that is obtainable by a communication performed through an execution of the program between the semiconductor memory card and another device; and
   a return unit operable to return the information stored in the register to the register when the detection unit detects a predetermined increase of the supply voltage and when the additional information stored in the non-volatile memory satisfies a predetermined condition.

7. A semiconductor memory card which can execute a program, the memory card comprising:
   a non-volatile memory which stores information;
   a register which stores information regarding the program being executed;

a detection unit operable to detect a change in supply voltage to the semiconductor memory card;

a communication unit operable to communicate with another device;

a communication type obtainment unit operable to obtain information indicating a communication type used for the communication between the communication unit and the other device;

a save unit operable, when the detection unit detects a predetermined decrease of the supply voltage, to associate the information stored in the register with additional information for specifying the program, and to save the information stored in the register and the additional information to the non-volatile memory; and a return unit operable to return the information stored in the register to the register when the detection unit detects a predetermined increase of the supply voltage and when the additional information stored in the non-volatile memory includes information indicating the communication type obtained by the communication type obtainment unit.

8. A semiconductor memory card according to claim 7, wherein the information stored in the register includes plural pieces of information differing from one another.

9. A semiconductor memory card which can execute a program, the memory card comprising:

a non-volatile memory which stores information;

a register which stores information regarding the program being executed;

a detection unit operable to detect a change in supply voltage to the semiconductor memory card;

a communication unit operable to communicate with another device;

a save unit operable, when the detection unit detects a predetermined decrease of the supply voltage, to associate the information stored in the register with additional information for specifying the program, and to save the information stored in the register and the additional information to the non-volatile memory, to associate encryption information with the information stored in the register, and to save the encryption information with the information stored in the register to the non-volatile memory, the associate encryption information indicating a strength of an encryption used by the program;

a return judgment unit operable to judge whether or not the encryption strength is equal to or higher than a predetermined strength;

an authentication unit operable to authenticate the other device when the return judgment unit judges that the encryption strength indicated by the encryption information is equal to or higher than the predetermined strength; and a return unit operable to return the information stored in the register to the register when the detection unit detects a predetermined increase of the supply voltage, and when the additional information stored in the non-volatile memory satisfies a predetermined condition and authentication of the other device by the authentication unit is successful.

10. A semiconductor memory card which can execute a program, the memory card comprising:

a non-volatile memory which stores information, the non-volatile memory including a destructive readout region;

a register which stores information regarding the program being executed;

a detection unit operable to detect a change in supply voltage to the semiconductor memory card;

a save judgment unit operable to judge whether or not an encryption strength used by the program being executed is equal to or higher than a predetermined strength;

a save unit operable, when the detection unit detects a predetermined decrease of the supply voltage and the save judgment unit judges that the encryption strength is equal to or higher than the predetermined strength, to associate the information stored in the register with additional information for specifying the program, and to save the information stored in the register and the additional information to the destructive readout region of the non-volatile memory; and a return unit operable to return the information stored in the register to the register when the detection unit detects a predetermined increase of the supply voltage and when the additional information stored in the non-volatile memory satisfies a predetermined condition.

11. A semiconductor memory card according to claim 10, wherein the non-volatile memory is Ferroelectric Random Access Memory (FeRAM).

\* \* \* \* \*